United States Patent
Jeon et al.

(10) Patent No.: US 12,216,599 B2
(45) Date of Patent: Feb. 4, 2025

(54) PERIPHERAL COMPONENT INTERCONNECT EXPRESS (PCIE) DEVICE METHOD FOR DELAYING COMMAND OPERATIONS BASED ON GENERATED THROUGHPUT ANALYSIS INFORMATION

(71) Applicant: SK hynix Inc., Icheon (KR)

(72) Inventors: Yong Tae Jeon, Icheon (KR); Ji Woon Yang, Icheon (KR); Sang Hyun Yoon, Icheon (KR); Se Hyeon Han, Icheon (KR)

(73) Assignee: SK hynix Inc., Icheon (KR)

(*) Notice: Subject to any disclaimer, the term of this patent is extended or adjusted under 35 U.S.C. 154(b) by 226 days.

(21) Appl. No.: 17/567,609

(22) Filed: Jan. 3, 2022

(65) Prior Publication Data

US 2022/0300442 A1  Sep. 22, 2022

(30) Foreign Application Priority Data

Mar. 18, 2021 (KR) .................. 10-2021-0035522
Mar. 23, 2021 (KR) .................. 10-2021-0037503
Mar. 23, 2021 (KR) .................. 10-2021-0037512

(51) Int. Cl.
*G06F 13/28* (2006.01)
*G06F 13/40* (2006.01)
*G06F 13/42* (2006.01)

(52) U.S. Cl.
CPC .......... *G06F 13/28* (2013.01); *G06F 13/4027* (2013.01); *G06F 13/4221* (2013.01);
(Continued)

(58) Field of Classification Search
CPC .. G06F 13/28; G06F 13/4027; G06F 13/4221; G06F 2213/0026; G06F 2213/2806
See application file for complete search history.

(56) References Cited

U.S. PATENT DOCUMENTS 7,852,757 B1  12/2010  Puranik
8,199,759 B2   6/2012  Singhal et al.
(Continued)

FOREIGN PATENT DOCUMENTS

JP  2007065847 A  3/2007
JP  2015-503154 A  1/2015
(Continued)

OTHER PUBLICATIONS

Office Action dated Sep. 6, 2022 for U.S. Appl. No. 17/467,054.
(Continued)

*Primary Examiner* — Tammara R Peyton

(57) ABSTRACT

Provided are a Peripheral Component Interconnect Express (PCIe) device and a method of operating the same. The PCIe device may include a performance analyzer, a delay time information generato and a command fetcher. The performance analyzer may measure throughputs of a plurality of functions, and generate throughput analysis information indicating a comparison result between the throughputs of the plurality of functions and throughput limits corresponding to the plurality of functions. The delay time information generator may generate a delay time for delaying a command fetch operation for each of the plurality of functions based on the throughput analysis information. The command fetcher may fetch a target command from a host based on a delay time of a function corresponding to the target command.

15 Claims, 22 Drawing Sheets

(52) U.S. Cl.
CPC ............... *G06F 2213/0024* (2013.01); *G06F 2213/0026* (2013.01); *G06F 2213/2806* (2013.01)

(56) References Cited

U.S. PATENT DOCUMENTS

| | | | |
|---|---|---|---|
| 9,996,484 | B1 | 6/2018 | Davis et al. |
| 10,176,126 | B1 | 1/2019 | Banerjee et al. |
| 11,741,039 | B2 * | 8/2023 | Jeon .................. G06F 13/4221 710/313 |
| 2006/0168384 | A1 | 7/2006 | Radhakrishnan et al. |
| 2006/0242332 | A1 | 10/2006 | Johnsen et al. |
| 2006/0259656 | A1 | 11/2006 | Sullivan |
| 2007/0220193 | A1 | 9/2007 | Ikeda et al. |
| 2008/0301605 | A1 | 12/2008 | Ando et al. |
| 2009/0049256 | A1 | 2/2009 | Hughes et al. |
| 2009/0103434 | A1 | 4/2009 | Madsen et al. |
| 2010/0250785 | A1 | 9/2010 | Shin et al. |
| 2011/0134915 | A1 | 6/2011 | Srinivasan |
| 2011/0289242 | A1 | 11/2011 | Srinivasan et al. |
| 2012/0005300 | A1 | 1/2012 | Muppalla |
| 2012/0072679 | A1 | 3/2012 | Biswas et al. |
| 2014/0237156 | A1 | 8/2014 | Regula et al. |
| 2014/0281053 | A1 | 9/2014 | Suzuki et al. |
| 2014/0281099 | A1 | 9/2014 | Avez et al. |
| 2016/0162436 | A1 | 6/2016 | Raghavan et al. |
| 2017/0123730 | A1 | 5/2017 | Losh |
| 2018/0293101 | A1 | 10/2018 | Park et al. |
| 2019/0058675 | A1 | 2/2019 | Schubert et al. |
| 2019/0113957 | A1 | 4/2019 | Chiu et al. |
| 2019/0146684 | A1 | 5/2019 | Benisty et al. |
| 2019/0179784 | A1 | 6/2019 | Tsuji et al. |
| 2019/0354300 | A1 | 11/2019 | Benisty et al. |
| 2020/0065028 | A1 | 2/2020 | Keil et al. |
| 2020/0293499 | A1 | 9/2020 | Kohli et al. |
| 2020/0304426 | A1 | 9/2020 | Zhao et al. |
| 2021/0075732 | A1 | 3/2021 | Singh et al. |
| 2021/0224210 | A1 | 7/2021 | Ouyang et al. |
| 2022/0124051 | A1 | 4/2022 | Brewer et al. |

FOREIGN PATENT DOCUMENTS

| | | | |
|---|---|---|---|
| JP | 2019505924 | A | 2/2019 |
| KR | 10-2004-0029010 | A | 4/2004 |
| KR | 10-2016-0075312 | A | 6/2012 |
| KR | 101414079 | B1 | 7/2014 |
| KR | 10-2016-0016557 | A | 2/2016 |
| KR | 10-2018-0019567 | A | 2/2018 |
| KR | 1020190032716 | A | 3/2019 |
| KR | 10-2020-0016810 | A | 2/2020 |
| KR | 1020200073592 | A | 6/2020 |
| KR | 102238652 | B1 | 4/2021 |

OTHER PUBLICATIONS

Office Action dated Nov. 9, 2022 for U.S. Appl. No. 17/467,070.
Office Action dated Jun. 27, 2022 for U.S. Appl. No. 17/467,070.
1 Office Action dated Jan. 12, 2023 for U.S. Appl. No. 17/467,078.
Office Action dated Feb. 21, 2023 for U.S. Appl. No. 17/467,054.
Notice of Allowance dated Sep. 7, 2023 regarding U.S. Appl. No. 17/467,078.
Office Action dated Mar. 27, 2023 for U.S. Appl. No. 17/467,070.
1 Notice of Allowance dated Feb. 9, 2024, for U.S. Appl. No. 17/467,070.
Office Action dated Oct. 18, 2023 for U.S. Appl. No. 17/467,070.

* cited by examiner

FIG. 5

| VC Configurations | TC/VC Mapping Options |
|---|---|
| VC0 | TC(0-7)/VC0 |
| VC0, VC1 | TC(0-6)/VC0, TC7/VC1 |
| VC0-VC3 | TC(0-1)/VC0, TC(2-4)/VC1, TC(5-6)/VC2, TC7/VC3 |
| VC0-VC7 | TC[0:7]/VC[0:7] |

Notes on conventions:

TCn/VCk          TCn mapped to VCk

TC(n-m)/VCk     All TCs in the range n-m mapped to VCk (i.e., to the same VC)

TC[n:m]/VC[n:m]    TCn/VCn, TCn+1/VCn+1, ⋯, TCm/VCm

PERIPHERAL COMPONENT INTERCONNECT EXPRESS (PCIE) DEVICE METHOD FOR DELAYING COMMAND OPERATIONS BASED ON GENERATED THROUGHPUT ANALYSIS INFORMATION

CROSS-REFERENCE TO RELATED APPLICATION

The present application claims priority under 35 U.S.C. § 119(a) to Korean patent application number 10-2021-0037503, filed on Mar. 23, 2021, Korean patent application number 10-2021-0037512, filed on Mar. 23, 2021, and Korean patent application number 10-2021-0035522, filed on Mar. 18, 2021. The disclosure of each of foregoing applications is incorporated herein by reference in its entirety.

BACKGROUND

1. Technical Field

Various embodiments of the present disclosure generally relate to an electronic device, and more particularly to a PCIe interface device and a method of operating the PCIe interface device.

2. Related Art

Peripheral Component Interconnect Express (PCIe) is an interface having a serial structure for data communication. A PCIe-based storage device supports a multi-port structure and a multi-function structure. The PCIe-based storage device may be virtualized or non-virtualized, and may achieve Quality of Service (QoS) of a host input/output (I/O) command through one or more PCIe functions.

A storage device is a device which stores data under the control of a host device such as a computer or a smartphone. The storage device may include a memory device in which data is stored and a memory controller which controls the memory device. Memory devices are classified into a volatile memory device and a nonvolatile memory device.

The volatile memory device is a memory device in which data is stored only when power is supplied and in which stored data is lost when the supply of power is interrupted. Examples of the volatile memory device may include a static random access memory (SRAM) and a dynamic random access memory (DRAM).

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to a PCIe interface device that provides uniform quality of service (QoS) for respective functions and a method of operating the PCIe interface device.

An embodiment of the present disclosure may provide for a Peripheral Component Interconnect Express (PCIe) interface device. The PCIe interface device may include a performance analyzer and a traffic class controller. The performance analyzer may be configured to measure throughputs of multiple functions executed on one or more Direct Memory Access (DMA) devices. The traffic class controller may be configured to allocate traffic class values to transaction layer packets received from the multiple functions based on the throughputs of the multiple functions.

An embodiment of the present disclosure may provide for a method of operating a Peripheral Component Interconnect Express (PCIe) interface device. The method may include measuring throughputs of multiple functions executed on one or more Direct Memory Access (DMA) devices, and allocating traffic class values to transaction layer packets received from the multiple functions based on the throughputs of the multiple functions.

Various embodiments of the present disclosure are directed to a PCIe interface device having improved buffer control performance and a method of operating the PCIe interface device.

An embodiment of the present disclosure may provide for a Peripheral Component Interconnect Express (PCIe) interface device. The PCIe interface device may include a first buffer, a second buffer, and a buffer controller. The first buffer may be configured to store a plurality of first transaction layer packets received from multiple functions. The second buffer may be configured to store a plurality of second transaction layer packets received from the multiple functions. The buffer controller may be configured to, when a first buffer of a switch is full, realign an order in which the plurality of second transaction layer packets are to be output from the second buffer to the switch, based on respective IDs of the plurality of second transaction layer packets.

An embodiment of the present disclosure may provide for a method of operating a Peripheral Component Interconnect Express (PCIe) interface device, the PCIe interface device including a first buffer configured to store a plurality of first transaction layer packets and a second buffer configured to store a plurality of second transaction layer packets. The method may include receiving, from a switch, a flow control signal indicating whether a first buffer of the switch is full, and when the first buffer included in the switch is full, realigning an order in which the plurality of second transaction layer packets are to be output from the second buffer to the switch, based on IDs of the plurality of second transaction layer packets.

Various embodiments of the present disclosure are directed to a PCIe device capable of limiting performance for each function and a method of operating the PCIe device.

An embodiment of the present disclosure may provide for a Peripheral Component Interconnect Express (PCIe) device. The PCIe device may include a throughput calculator configured to calculate a throughput of each of a plurality of functions, a throughput analysis information generator configured to generate, for each of the plurality of functions, throughput analysis information indicating a result of a comparison between a throughput limit that is set for each of the plurality of functions and the calculated throughput, a delay time information generator configured to generate a delay time for delaying a command fetch operation for each of the plurality of functions based on the throughput analysis information, a command lookup table storage configured to store command-related information and a delay time of a function corresponding to a target command, the command-related information including information related to the target command to be fetched from a host, and a command fetcher configured to fetch the target command from the host based on the command-related information and the delay time of the corresponding function.

An embodiment of the present disclosure may provide for a method of operating a Peripheral Component Interconnect Express (PCIe) device. The method may include calculating a throughput of each of a plurality of functions, generating, for each of the plurality of functions, throughput analysis information indicating a result of a comparison between a throughput limit that is set for each of the plurality of functions and the calculated throughput, generating a delay time for delaying a command fetch operation for each of the plurality of functions based on the throughput analysis information, acquiring command-related information including information related to a target command to be fetched from a host, and fetching the target command from the host based on the command-related information and a delay time of a function corresponding to the target command, among the plurality of functions.

An embodiment of the present disclosure may provide for a Peripheral Component Interconnect Express (PCIe) device and a method of operating the same. The PCIe device may include a performance analyzer, a delay time information generato and a command fetcher. The performance analyzer may measure throughputs of a plurality of functions, and generate throughput analysis information indicating a comparison result between the throughputs of the plurality of functions and throughput limits corresponding to the plurality of functions. The delay time information generator may generate a delay time for delaying a command fetch operation for each of the plurality of functions based on the throughput analysis information. The command fetcher may fetch a target command from a host based on a delay time of a function corresponding to the target command.

An embodiment of the present disclosure may provide for a Peripheral Component Interconnect Express (PCIe) device and a method of operating the same. The PCIe device may include a performance analyzer, a write buffer, a read buffer and a buffer controller. The performance analyzer may measure throughputs of a plurality of functions executed on one or more Direct Memory Access (DMA) devices. The write buffer may store a plurality of first transaction layer packets received from the plurality of functions. The read buffer may store a plurality of second transaction layer packets received from the plurality of functions. The buffer controller may realign, when a write buffer of a switch is full, an order in which the plurality of second transaction layer packets are to be output from the read buffer to a read buffer of the switch, based on IDs of the plurality of second transaction layer packets.

BRIEF DESCRIPTION OF THE DRAWINGS

FIG. 5 illustrates a mapping table between virtual channels and traffic classes according to an embodiment of the present disclosure.

DETAILED DESCRIPTION

Specific structural or functional descriptions in the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

The present disclosure describes three main embodiments, and each main embodiment includes a plurality of embodiments. The main embodiments may be described in detail through FIGS. 1 to 10, FIGS. 11 to 15, and FIGS. 16 to 24, respectively.

1. A PCIe interface device that provides uniform quality of service (QoS) for respective functions and a method of operating the PCIe interface device.

Figure 1:
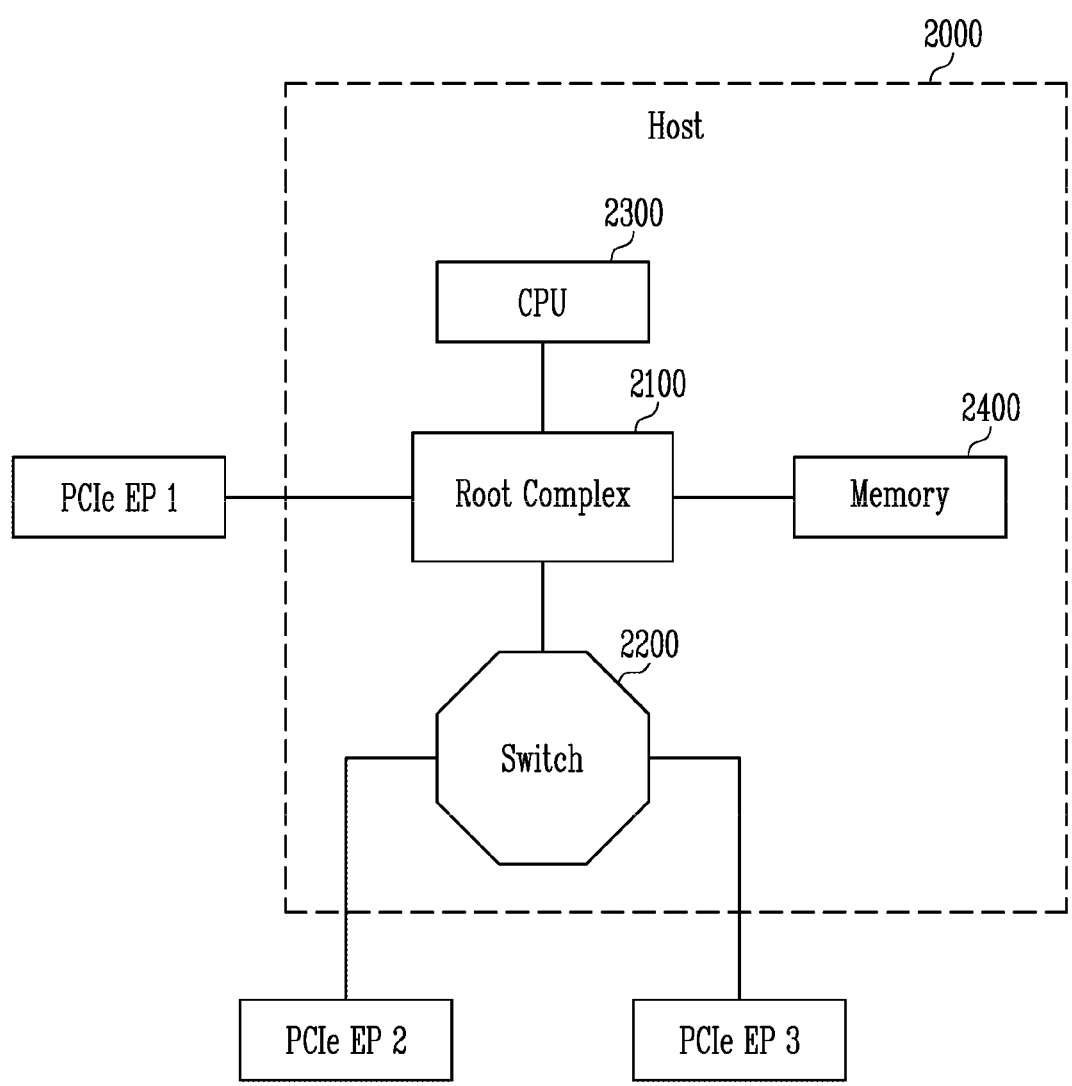
FIG. 1 illustrates a communication structure between a host and PCIe endpoints according to an embodiment of the present disclosure.

FIG. 1 illustrates a communication structure between a host and a plurality of PCIe endpoints (EPs) according to an embodiment of the present disclosure.

Referring to FIG. 1, a host 2000 may include a root complex 2100, a switch 2200, a Central Processing Unit (CPU) 230, and a memory 2400.

The root complex 2100 may couple the CPU 2300 and the memory 2400 to an input/output (I/O) hierarchy. The root complex 2100 may include at least one host bridge and at least one root port. The root complex 2100 may support one or more PCIe ports.

The root complex 2100 may support input/output (I/O) requests. The root complex 2100 must support generation of configuration requests. The root complex 2100 must not support lock semantics as a completer. The root complex 2100 may request generation of a locked request as a requester.

The switch 2200 may couple at least two ports to each other so as to route transaction layer packets. The switch 2200 may be a set of virtual PCI-to-PCI bridge devices. The switch 2200 may be composed of two or more logical PCI-to-PCI bridges. The switch 2200 may route a transaction using a PCI bridge mechanism (i.e., an address-based multicasting manner). The switch 2200 must route all types of transaction layer packets between all ports. The switch 2200 must support a locked request. Each enabled port of the switch 2200 must support a flow control. The switch 2200 may arbitrate a contention in a round robin or weighted round robin manner when the contention occurs on the same virtual channel.

Each PCIe endpoint (EP) may function as a requester or a completer of a PCIe transaction.

In FIG. 1, a first PCIe endpoint (PCIe EP 1) may transmit and receive transaction layer packets to and from the root complex 2100. Second and third PCIe endpoints (PCIe EP 2 and PCIe EP3) may transmit and receive transaction layer packets to and from the switch 2200.

The switch 2200 may route the transaction layer packets, received from the second and third PCIe endpoints (PCIe EP 2 and PCIe EP3), to the root complex 2100. The switch 2200 may route transaction layer packets, received from the root complex 2100, to the second and third PCIe endpoints (PCIe EP 2 and PCIe EP3).

Therefore, the root complex 2100 may transmit and receive transaction layer packets directly to and from the first PCIe endpoint (PCIe EP 1). The root complex 2100 may transmit and receive transaction layer packets to and from the second and third PCIe endpoints (PCIe EP 2 and PCIe EP3) through the switch 2200. The root complex 2100 may forward the transaction layer packets, received from the first to third PCIe endpoints (PCIe EP 1 to PCIe EP3), to the CPU 2300 or the memory 2400.

In the present disclosure, the term "PCIe EP" may be used interchangeably with "PCIe device".

Figure 2:
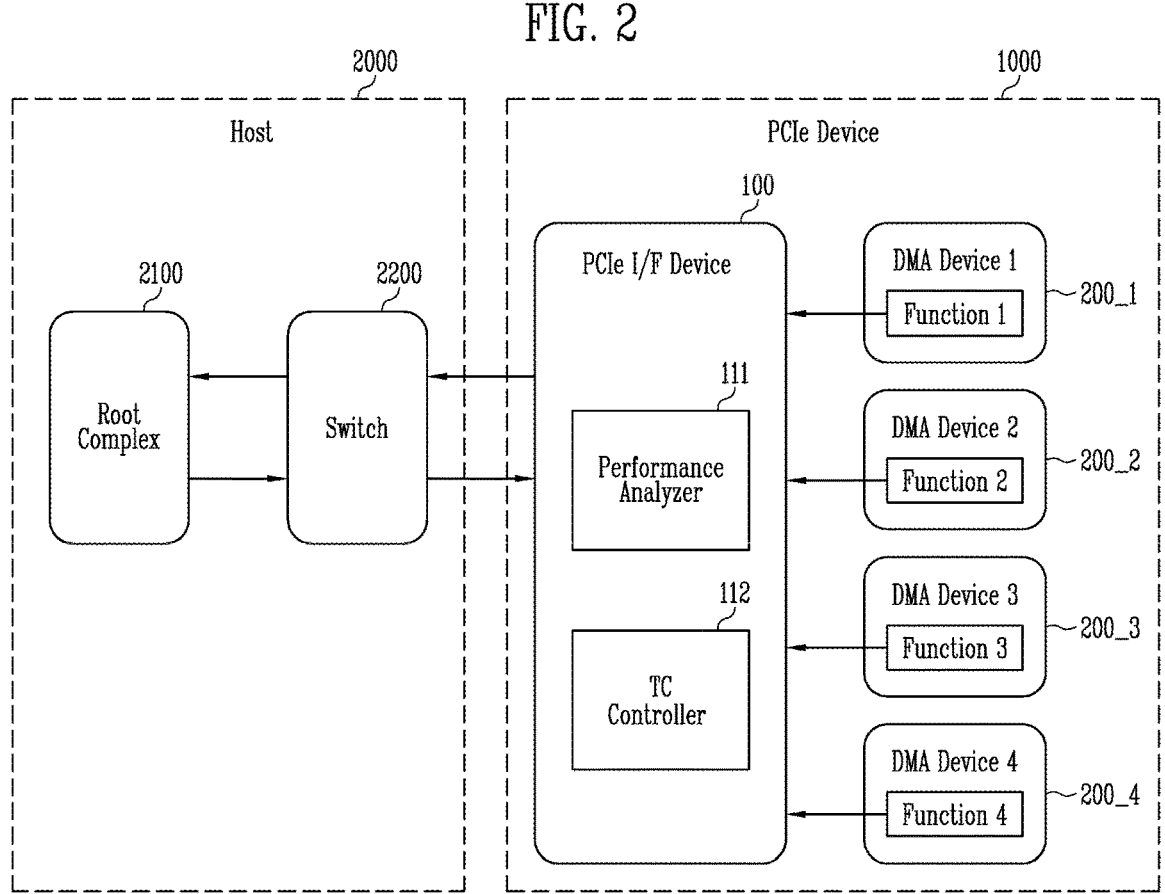
FIG. 2 illustrates the configuration and operation of a PCIe device according to an embodiment of the present disclosure.

FIG. 2 illustrates the configuration and operation of a PCIe device according to an embodiment of the present disclosure.

Referring to FIG. 2, a PCIe device 1000 may include a PCIe interface (I/F) device 100 and one or more Direct Memory Access (DMA) devices, e.g., 200_1 to 200_4. The PCIe device 1000 may be a PCIe endpoint described above with reference to FIG. 1. A host 2000 may include a root complex 2100, a switch 2200, a CPU (not illustrated), and a memory (not illustrated), similarly to the description made with reference to FIG. 1.

The PCIe interface device 100 may receive transaction layer packets from multiple functions (Function 1 to Function 4) respectively executed on the DMA devices 200_1 to 200_4. The PCIe interface device 100 may route the received transaction layer packets to the switch 2200 of the host 2000. The PCIe interface device 100 may dynamically allocate traffic class values to the received transaction layer packets based on throughputs of the respective functions. Traffic classes may be labels of transaction layer packets that are routed between unmodified endpoints.

The PCIe interface device 100 may include a performance analyzer 111 and a traffic class (TC) controller 112.

The performance analyzer 111 may measure the throughputs of the multiple functions respectively executed on the DMA devices 200_1 to 200_4. The multiple functions may share a data path, which couples the DMA devices 200_1 to 200_4 to the PCIe interface device 100, with each other. The performance analyzer 111 may calculate the throughputs of the multiple functions based on occupation rates of the multiple functions for the data path. The performance analyzer 111 may calculate an occupation rate of a function based on the number of transaction layer packets corresponding to the function processed through the data path per unit time.

The traffic class controller 112 may dynamically allocate traffic class values to transaction layer packets received from the multiple functions based on the throughputs of the multiple functions. Whenever a ranking of the throughputs of the multiple functions varies, the traffic class controller 112 may reallocate traffic class values to the transaction layer packets based on the varied ranking.

The traffic class controller 112 may allocate a preset default value as initial values for traffic classes of the transaction layer packets received from the multiple functions.

The traffic class controller 112 may allocate different traffic class values to the transaction layer packets based on results of comparing the throughputs of the multiple functions with a threshold value. The traffic class controller 112 may allocate a default value as traffic class values of transaction layer packets received from a function having a throughput that is greater than the threshold value, among the multiple functions. The traffic class controller 112 may determine a ranking of traffic class values of transaction layer packets received from functions having throughputs that are less than or equal to the threshold value, among the multiple functions, in a reverse order of the ranking of the throughputs of the multiple functions. An embodiment for allocating traffic class values will be described in detail later with reference to FIG. 7. In an embodiment, the preset default value may be the same as the default value.

The traffic class controller 112 may allocate the default value as traffic class values of transaction layer packets received from an interrupted function among the multiple functions.

As will be described later with reference to FIG. 6, the switch 2200 or the root complex 2100 may determine virtual channels to be mapped to the transaction layer packets according to the allocated traffic class values. The switch 2200 or the root complex 2100 may determine an order in which the transaction layer packets are to be output to the outside according to the virtual channels mapped to the transaction layer packets.

The DMA devices 200_1 to 200_4 may include one or more of a NonVolatile Memory Express (NVMe) device, a Solid State Drive (SSD) device, an Artificial Intelligence Central Processing Unit (AI CPU), an Artificial Intelligence System on Chip (AI SoC), an Ethernet device, a sound card, a graphics card, and so on. However, the DMA devices 200_1 to 200_4 are not limited thereto, and may include other types of electronic devices employing a PCIe interface. Functions may be executed on the DMA devices 200_1 to 200_4, and may be software or firmware which processes transactions of transaction layer packets.

For each of the DMA devices 200_1 to 200_4, one or more functions may be executed. In FIG. 2, one function may be executed on each of the DMA devices 200_1 to 200_4.

For example, a first function (Function 1) may be executed on the first DMA device 200_1. A second function (Function 2) may be executed on the second DMA device 200_2. A third function (Function 3) may be executed on the third DMA device 200_3. A fourth function (Function 4) may be executed on the fourth DMA device 200_4.

However, the number of functions executed on each DMA device is not limited to the present embodiment. For example, the PCIe device 1000 may generate a physical function or a virtual function in response to a virtualization request received from the host 2000. The PCIe device 1000 may allocate the generated functions to respective DMA devices. The number of functions allocated to and executed on each DMA device may be individually set. Therefore, one or more functions may be allocated to one DMA device, and each of the one or more functions may be executed as an independent operation unit.

Figure 3:
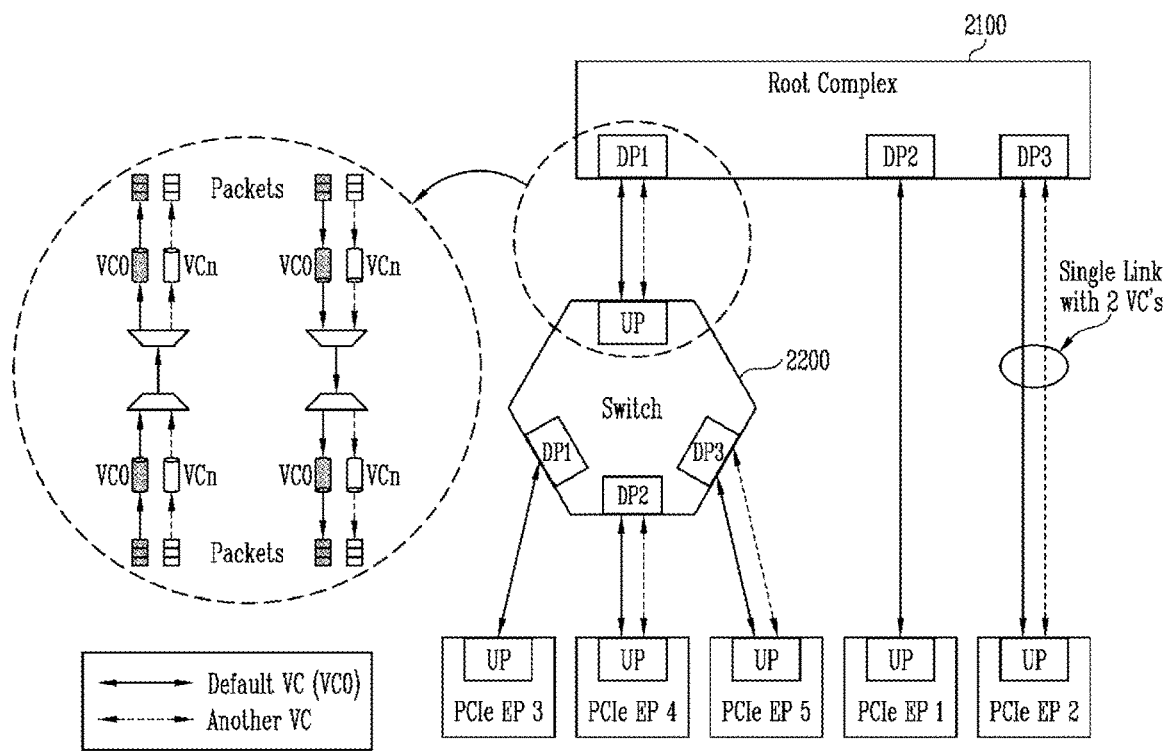
FIG. 3 illustrates virtual channels in a PCIe link.

FIG. 3 illustrates virtual channels VC in a PCIe link.

Referring to FIG. 3, upstream ports UP of PCIe endpoints (PCIe EP 1 to PCIe EP 5) may be coupled to downstream ports DP of a root complex 2100 or downstream ports DP of a switch 2200. Upstream ports UP of the switch 2200 may be coupled to downstream ports DP of the root complex 2100.

In FIG. 3, an upstream port UP of a first PCIe endpoint (PCIe EP 1) may be coupled to a second downstream port DP2 of the root complex 2100. An upstream port UP of a second PCIe endpoint (PCIe EP 2) may be coupled to a third downstream port DP3 of the root complex 2100.

The first PCIe endpoint (PCIe EP 1) may communicate with the root complex 2100 through a single link with which a single virtual channel is established. A virtual channel may be set to a default channel VC0.

The second PCIe endpoint (PCIe EP 2) may communicate with the root complex 2100 through a single link with which two virtual channels are established. The two virtual channels may include a default channel VC0 and another virtual channel. The number of virtual channels that can be established with a single link is not limited to the present embodiment.

An upstream port UP of a third PCIe endpoint (PCIe EP 3) may be coupled to a first downstream port DP1 of the switch 2200. An upstream port UP of a fourth PCIe endpoint (PCIe EP 4) may be coupled to a second downstream port DP2 of the switch 2200. An upstream port UP of a fifth PCIe endpoint (PCIe EP 5) may be coupled to a third downstream port DP3 of the switch 2200. An upstream port UP of the switch 2200 may be coupled to a first downstream port DP1 of the root complex 2100.

The third to fifth PCIe endpoints (PCIe EP 3 to PCIe EP 5) may communicate with the root complex 2100 through the switch 2200.

The third PCIe endpoint (PCIe EP 3) may communicate with the switch 2200 through a single link with which one virtual channel is established. The virtual channel may be set to a default channel VC0. The fourth PCIe endpoint (PCIe EP 4) may communicate with the switch 2200 through a single link with which two virtual channels are established. The two virtual channels may include a default channel VC0 and another virtual channel. The fifth PCIe endpoint (PCIe EP 5) may communicate with the switch 2200 through a single link with which two virtual channels are established. The two virtual channels may include a default channel VC0 and another virtual channel.

The switch 2200 may communicate with the root complex 2100 through a single link with which two virtual channels are established. The two virtual channels may include a default channel VC0 and another virtual channel.

Figure 4:
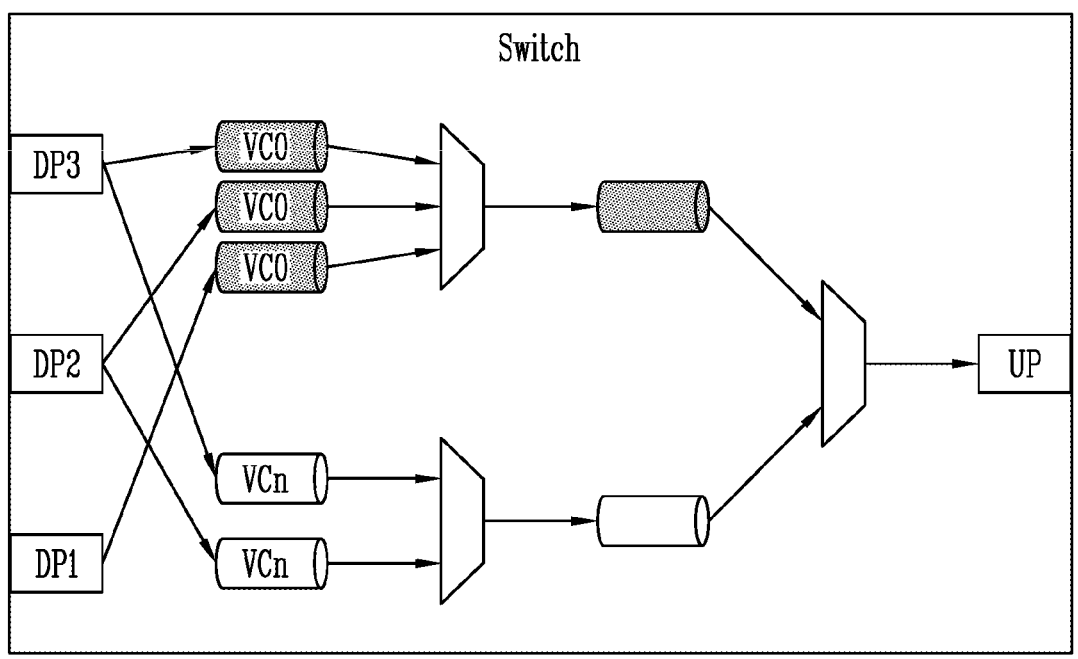
FIG. 4 illustrates virtual channels in a switch of FIG. 3.

FIG. 4 illustrates virtual channels in the switch of FIG. 3.

Referring to FIG. 4, the switch may include first to third downstream ports DP1 to DP3 and an upstream port UP.

A transaction layer packet received from the first downstream port DP1 may be forwarded to the upstream port UP through a default channel VC0. A transaction layer packet received from the second downstream port DP2 may be forwarded to the upstream port UP through a default channel VC0 and an additional virtual channel VCn (where n is a natural number). A transaction layer packet received from the third downstream port DP3 may be forwarded to the upstream port UP through a default channel VC0 and an additional virtual channel VCn.

An order in which the transaction layer packets received through the default channel VC0 and the additional virtual channel VCn are to be output to the outside through the upstream port UP may be determined based on internal configuration information of the switch. For example, a transaction layer packet received through the additional virtual channel VCn may be output through the upstream port UP to the outside of the switch before a transaction layer packet received through the default channel VC0 is output to the outside.

FIG. 5 illustrates a mapping table between virtual channels and traffic classes according to an embodiment. Referring to FIG. 5, a virtual channel mechanism may provide differentiated traffic to the overall fabric using different traffic classes. The reason for this is to prevent the occurrence of a bottleneck phenomenon caused by the use of a single traffic.

In an embodiment, one traffic class may be mapped to one virtual channel. In another embodiment, a plurality of traffic classes may be mapped to a single virtual channel. In another embodiment, the traffic classes may be mapped only to one virtual channel. That is, a single traffic class cannot be mapped to two or more virtual channels. A default value for the traffic classes may be TC0, and a default channel for the virtual channels may be VC0.

In FIG. 5, all of traffic classes TC0 to TC7 may be mapped to the default channel VC0.

When the traffic classes TC0 to TC7 are mapped to the virtual channels VC0 and VC1, the traffic classes TC0 to TC6 may be mapped to the default channel VC0, and the traffic class TC7 may be mapped to the virtual channel VC1.

When the traffic classes TC0 to TC7 are mapped to the virtual channels VC0 to VC3, the traffic classes TC0 and TC1 may be mapped to the default channel VC0, the traffic classes TC2 to TC4 may be mapped to the virtual channel VC1, the traffic classes TC5 and TC6 may be mapped to the virtual channel VC2, and the traffic class TC7 may be mapped to the virtual channel VC3.

The traffic classes TC0 to TC7 may be mapped in one-to-one correspondence to the virtual channels VC0 to VC7, respectively.

The number of virtual channels and the number of traffic classes are not limited to the present embodiment shown in FIG. 5.

Figure 6:
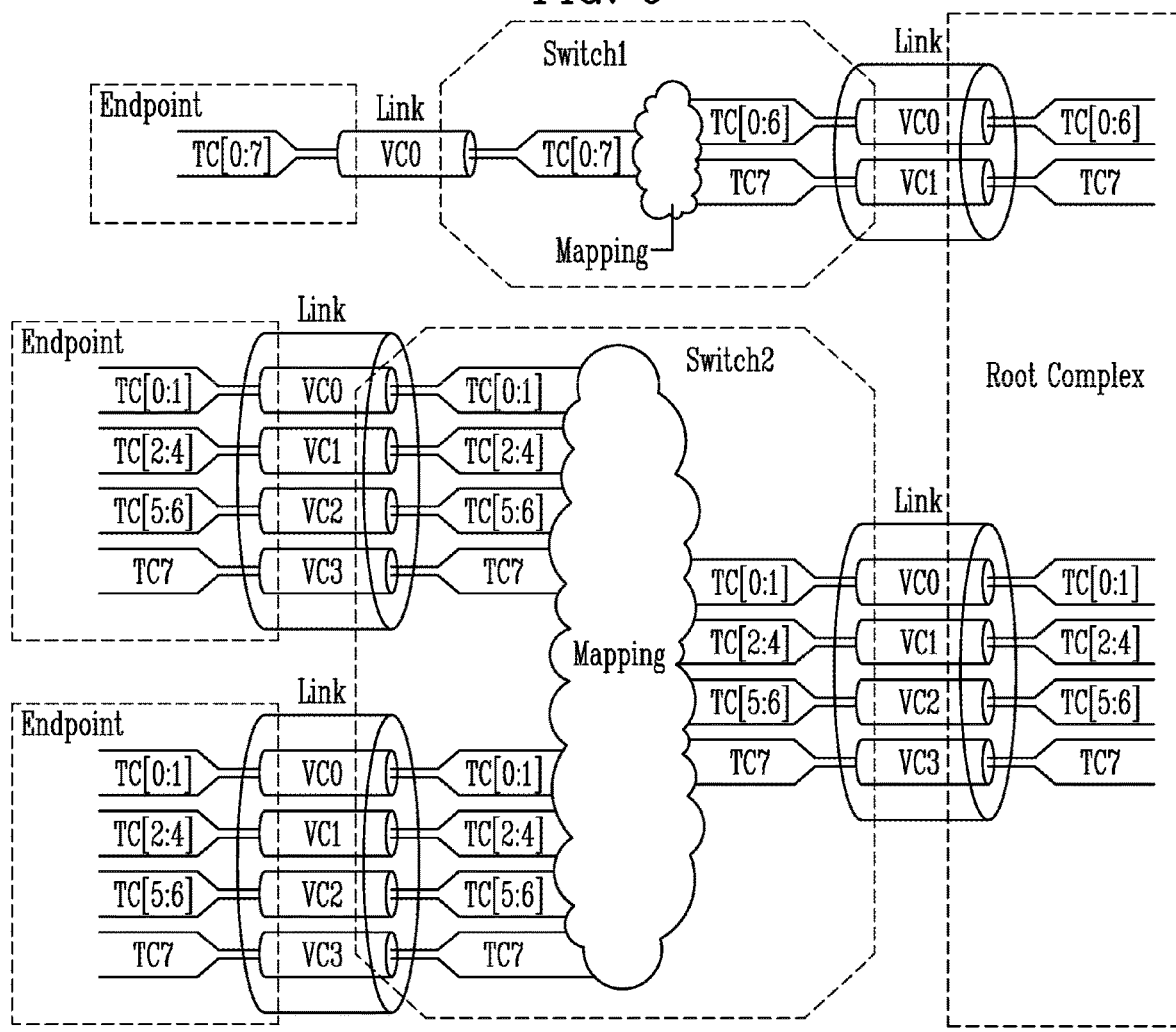
FIG. 6 illustrates a mapping structure between virtual channels and traffic classes depending on the mapping table described in FIG. 5.

FIG. 6 illustrates a mapping structure between virtual channels and traffic classes depending on the mapping table described in FIG. 5.

Referring to FIG. 6, transaction layer packets are routed through virtual channels mapped to traffic classes depending on traffic class values allocated to the transaction layer packets, and thus a transaction between components may be performed. Here, a switch or a root complex may perform ordering between the transaction layer packets depending on the traffic class values.

An independent logical data flow may be provided from a specific physical resource through virtual channels. For example, when a plurality of virtual channels are established in a single physical link, independent logical data flows may be provided for respective virtual channels.

The switch may route the transaction layer packets received through a link to the root complex. The switch may include a mapping table between traffic classes and virtual channels as configuration information. The configuration information of the switch may be changed in response to a request from a host. The mapping table may be set differently for respective switches. The switch may assign a virtual channel through which a transaction layer packet is to be transmitted depending on a traffic class value allocated to the transaction layer packet.

For example, a first switch (Switch 1) may map traffic classes TC[0:6] to a virtual channel VC0, and may map a traffic class TC7 to a virtual channel VC1. Therefore, a transaction layer packet having traffic classes TC[0:6] may be routed to the root complex through the virtual channel VC0. A transaction layer packet having the traffic class TC7 may be routed to the root complex through the virtual channel VC1. Depending on the configuration information of the first switch (Switch 1), the priorities or outputting order of transaction layer packets that are to be routed through the virtual channel VC0 and the virtual channel VC1 to the root complex may be determined.

A second switch (Switch 2) may map traffic classes TC[0:1] to a virtual channel VC0, map traffic classes TC[2:4] to a virtual channel VC1, map traffic classes TC[5:6] to a virtual channel VC2, and map traffic class TC7 to a virtual channel VC3.

As described above in relation to a process in which the first switch routes transaction layer packets, the transaction layer packets may be routed to the root complex through the virtual channels mapped to the traffic classes depending on the traffic class values. Depending on the configuration information of the second switch (Switch 2), the priorities or outputting order of transaction layer packets that are to be routed through the virtual channels VC0 to VC3 to the root complex may be determined.

Figure 7:
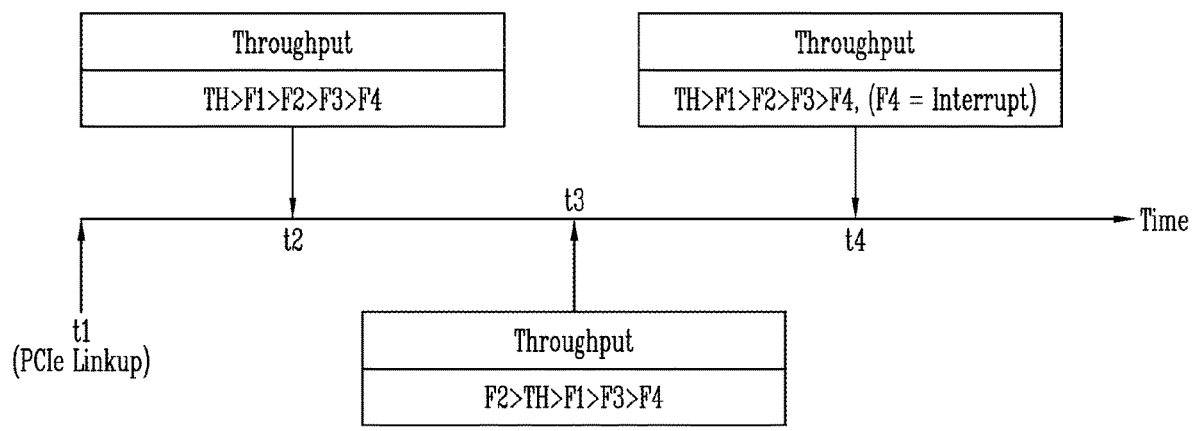
FIG. 7 illustrates a method of allocating traffic class values based on throughputs for respective functions according to an embodiment of the present disclosure.

FIG. 7 illustrates a method of allocating traffic class values based on throughputs for respective functions according to an embodiment of the present disclosure.

Referring to FIG. 7, the throughput of each function may be determined based on the number of transaction layer packets processed through a data path per unit time. A ranking of the throughputs of the respective functions may indicate a ranking of occupation rates of the respective functions for the data path.

The number of traffic class values to be allocated may be the same as the number of functions. In FIG. 7, traffic class values TC0 to TC3 may be allocated to transaction layer packets received from first to fourth functions F1 to F4. As a traffic class value is larger, a corresponding transaction layer packet may be set to have a higher priority. In another embodiment, as the traffic class value is smaller, the corresponding transaction layer packet may be set to have a higher priority.

At a time t1, the traffic class value TC0, which is a default value, may be allocated as all of traffic class values of the transaction layer packets received from the respective functions. The time t1 may be a time point at which a PCIe link is established (Linkup).

At a time t2, the throughputs of the first to fourth functions F1 to F4 may be less than a threshold value TH. The ranking of the throughputs may be decreased in an order of the first function F1, the second function F2, the third function F3, and the fourth function F4.

In an embodiment, when the throughputs of the first to fourth functions F1 to F4 are less than the threshold value TH, the traffic class values may be allocated in a reverse order of the ranking of the throughputs of the first to fourth functions F1 to F4. Therefore, the traffic class value TC0, which is the lowest traffic class value, may be mapped to a transaction layer packet of the first function F1 having the highest rank in throughput. The traffic class value TC1 greater than the traffic class value TC0 may be mapped to a transaction layer packet of the second function F2. The traffic class value TC2 greater than the traffic class value TC1 may be mapped to a transaction layer packet of the third function F3. The highest traffic class value TC3 greater than the traffic class value TC2 may be mapped to a transaction layer packet of the fourth function F4 having the lowest rank in throughput.

At a time t3, the throughput of the second function F2 may be greater than the threshold value TH.

In an embodiment, when a throughput of a function is greater than the threshold value TH, the default value TC0 may be allocated, as a traffic class value, to a transaction layer packet received from the corresponding function. Therefore, the traffic class value TC0, which is the default value, may be allocated to the transaction layer packet of the second function F2 for which the throughput is greater than the threshold value TH.

At this time, the throughputs of the first, third, and fourth functions F1, F3, and F4 may be less than the threshold value TH. Therefore, the traffic class values TC1 to TC3, which are not yet allocated, may be allocated to transaction layer packets in the reverse order of the ranking of the throughputs of the first, third, and fourth functions F1, F3, and F4.

For example, the lowest traffic class value TC1, among the traffic class values TC1 to TC3 which are not yet allocated, may be allocated to the transaction layer packet of the first function F1 having the highest rank in throughput among the first, third, and fourth functions F1, F3, and F4. The traffic class value TC2 may be allocated to the transaction layer packet of the third function F3. The traffic class value TC3 may be allocated to the transaction layer packet of the fourth function F4.

At a time t4, the throughputs of the first to fourth functions F1 to F4 may be less than the threshold value TH. The ranking of the throughputs may be decreased in the order of the first function F1, the second function F2, the third function F3, and the fourth function F4. However, at this time, the fourth function F4 may be an interrupted function.

In an embodiment, the default value TC0 may be allocated to a transaction layer packet received from the interrupted function. Therefore, the default value TC0 may be allocated to the transaction layer packet of the fourth function F4.

Since the throughputs of the first, second, and third functions F1, F2, and F3 are less than the threshold value TH, the traffic class values TC1 to TC3, which are not yet allocated, may be allocated to transaction layer packets in the reverse order of the ranking of the throughputs of the first, second, and third functions F1, F2, and F3.

For example, the lowest traffic class value TC1, among the traffic class values TC1 to TC3 which are not yet allocated, may be allocated to the transaction layer packet of the first function F1 having the highest rank in throughput among the first, second, and third functions F1, F2, and F3. The traffic class value TC2 may be allocated to the transaction layer packet of the second function F2. The traffic class value TC3 may be allocated to the transaction layer packet of the third function F3.

As described above with reference to FIG. 7, when the ranking of throughputs of functions varies or when the interruption occurs, the traffic class values may be reallocated to transaction layer packets.

In an embodiment of the present disclosure, the ordering of transaction layer packets may be performed by the switch or the root complex depending on traffic class values allocated to the transaction layer packets. For example, in the case where a high traffic class value is allocated to a transaction layer packet, a rank of processing the corresponding transaction layer packet in the switch or the root complex may be increased compared to the case where a low traffic class value is allocated to the corresponding transaction layer packet.

In accordance with an embodiment of the present disclosure, the PCIe interface device may allocate the traffic class value TC0, which is the lowest default value, to a transaction layer packet of a function when the throughput of a corresponding function is greater than the threshold value. The PCIe interface device may allocate traffic class values in a reverse order of a ranking of throughputs of functions when the throughputs of the functions are less than or equal to the threshold value. In this way, as an occupation rate of a function is lower within a range in which the throughput of the function is not greater than the threshold value, a higher traffic class value may be allocated to transaction layer packets of the function, thus enabling the occupation rates of respective functions to be equally achieved. Therefore, the PCIe interface device may achieve uniform QoS for the respective functions in a multi-function environment.

Figure 8:
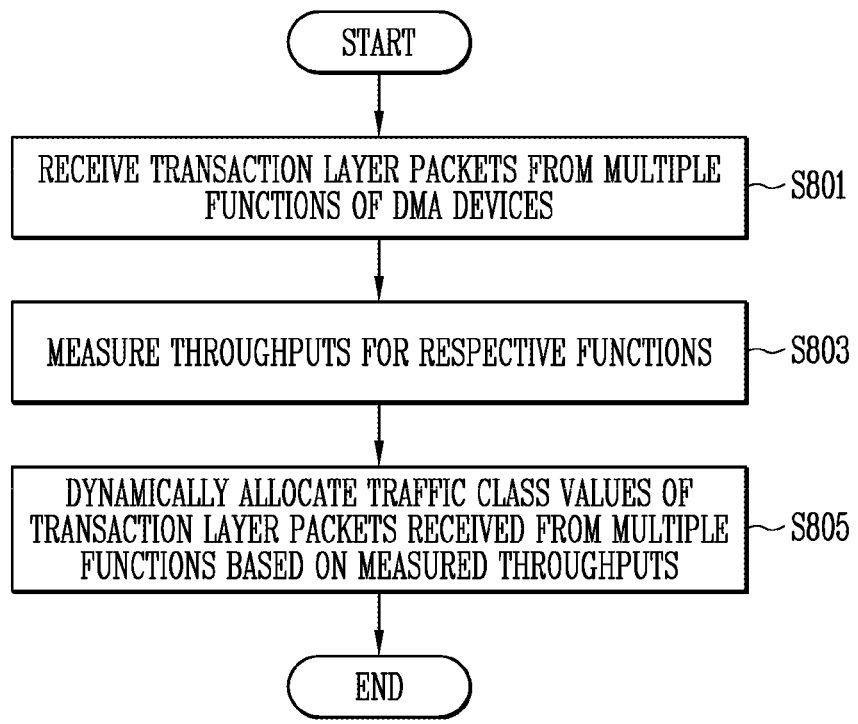
FIG. 8 is a flowchart illustrating an operation of a PCIe interface device according to an embodiment of the present disclosure.

FIG. 8 is a flowchart illustrating an operation of a PCIe interface device according to an embodiment of the present disclosure.

Referring to FIG. 8, at S801, the PCIe interface device may receive transaction layer packets from multiple functions of DMA devices.

At S803, the PCIe interface device may measure throughputs for the respective functions. The throughput of each function may be determined based on the number of transaction layer packets processed through a data path per unit time.

At S805, the PCIe interface device may dynamically allocate traffic class values to transaction layer packets received from the multiple functions based on the measured throughputs. A method of allocating the traffic class values will be additionally described below with reference to FIGS. 9 and 10.

Figure 9:
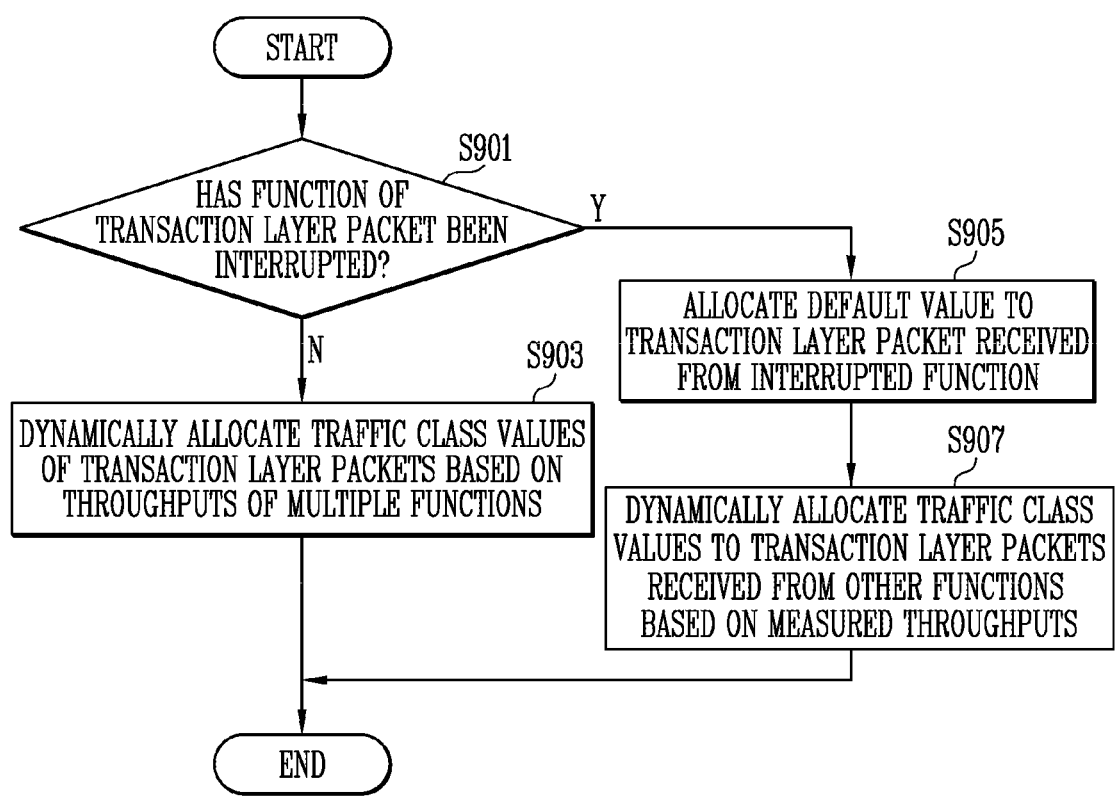
FIG. 9 is a flowchart illustrating a method of allocating traffic class values according to an embodiment of the present disclosure.

FIG. 9 is a flowchart illustrating a method of allocating traffic class values according to an embodiment.

Referring to FIG. 9, at S901, the PCIe interface device may determine whether a function of a received transaction layer packet has been interrupted, i.e., whether there is an interrupted function. The PCIe interface device proceeds to S905 when there is the interrupted function, and proceeds to S903 when there is no interrupted function.

At S905, the PCIe interface device may allocate a default value, as a traffic class value, to a transaction layer packet received from the interrupted function.

After that, at S907, the PCIe interface device may dynamically allocate the remaining traffic class values to transaction layer packets received from the other functions than the interrupted function based on the throughputs of the other functions.

When there is no interrupted function, at S903, the PCIe interface device may dynamically allocate the traffic class values to transaction layer packets received from the multiple functions based on the throughputs of the multiple functions.

Figure 10:
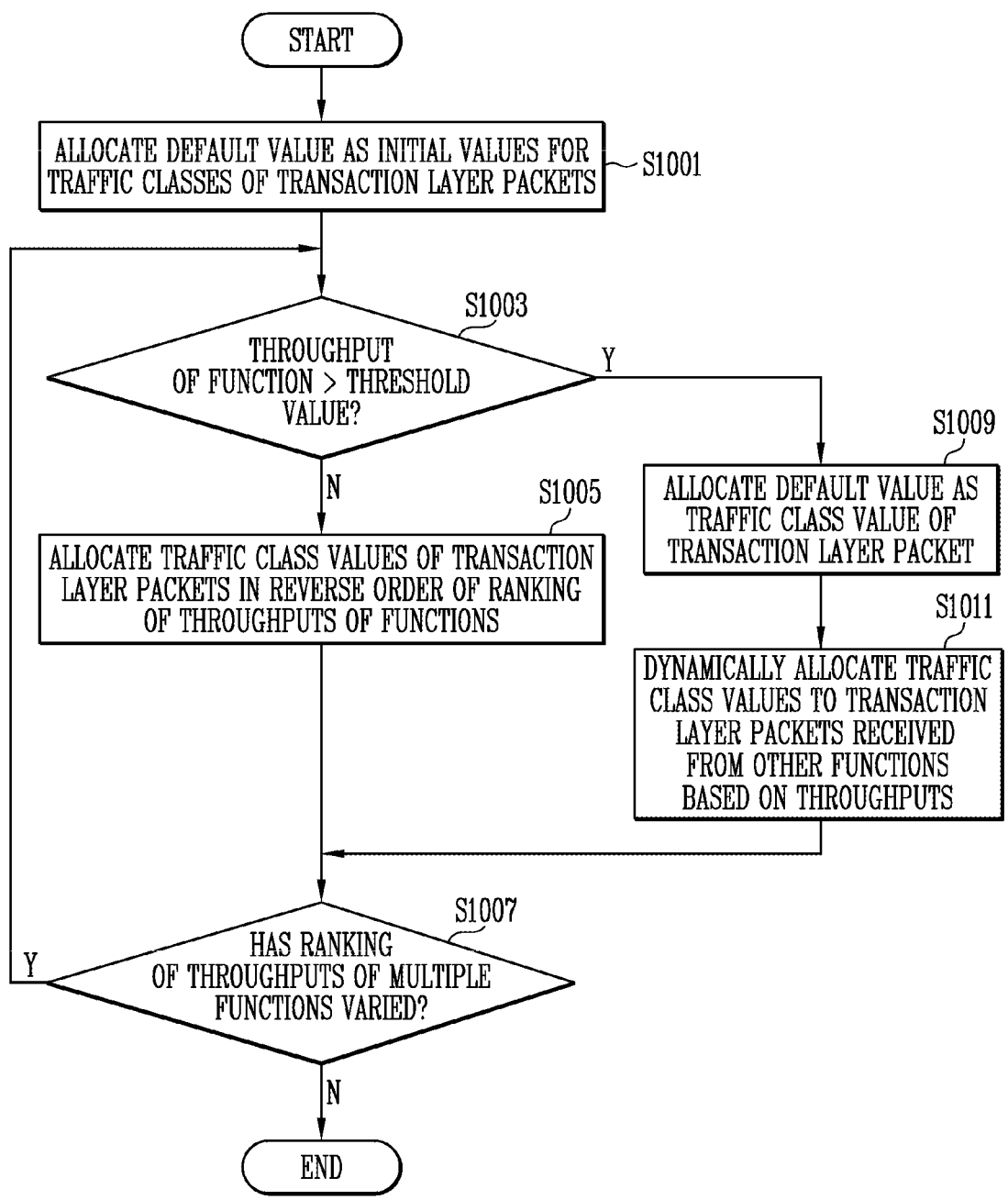
FIG. 10 is a flowchart illustrating a method of allocating traffic class values according to an embodiment of the present disclosure.

FIG. 10 is a flowchart illustrating a method of allocating traffic class values according to an embodiment.

Referring to FIG. 10, at S1001, the PCIe interface device may allocate a default value as initial values for traffic classes of received transaction layer packets.

At S1003, the PCIe interface device may determine whether the throughput of each function is greater than a threshold value. The PCIe interface device proceeds to S1009 when the throughput of the function is greater than the threshold value, and proceeds to S1005 when the throughput of the function is less than or equal to the threshold value.

At S1005, the PCIe interface device may dynamically allocate traffic class values to transaction layer packets in a reverse order of a ranking of the throughputs of multiple functions when the throughputs are less than or equal to the threshold value.

At S1007, the PCIe interface device may determine whether the ranking of the throughputs of the multiple functions has varied. When the ranking of the throughputs has varied, the PCIe interface device returns to S1003, whereas when the ranking of the throughputs has not varied, the PCI interface device terminates the operation.

At S1009, the PCIe interface device may allocate the default value as the traffic class value of the transaction layer packet received from the function for which the throughput is greater than the threshold value.

After that, at S1011, the PCIe interface device may dynamically allocate the remaining traffic class values to transaction layer packets received from the other functions than the function for which the throughput is greater than the threshold value based on the throughputs of the other functions. Then, the PCIe interface device proceeds to S1007.

2. A PCIe interface device having improved buffer control performance and a method of operating the PCIe interface device.

Figure 11:
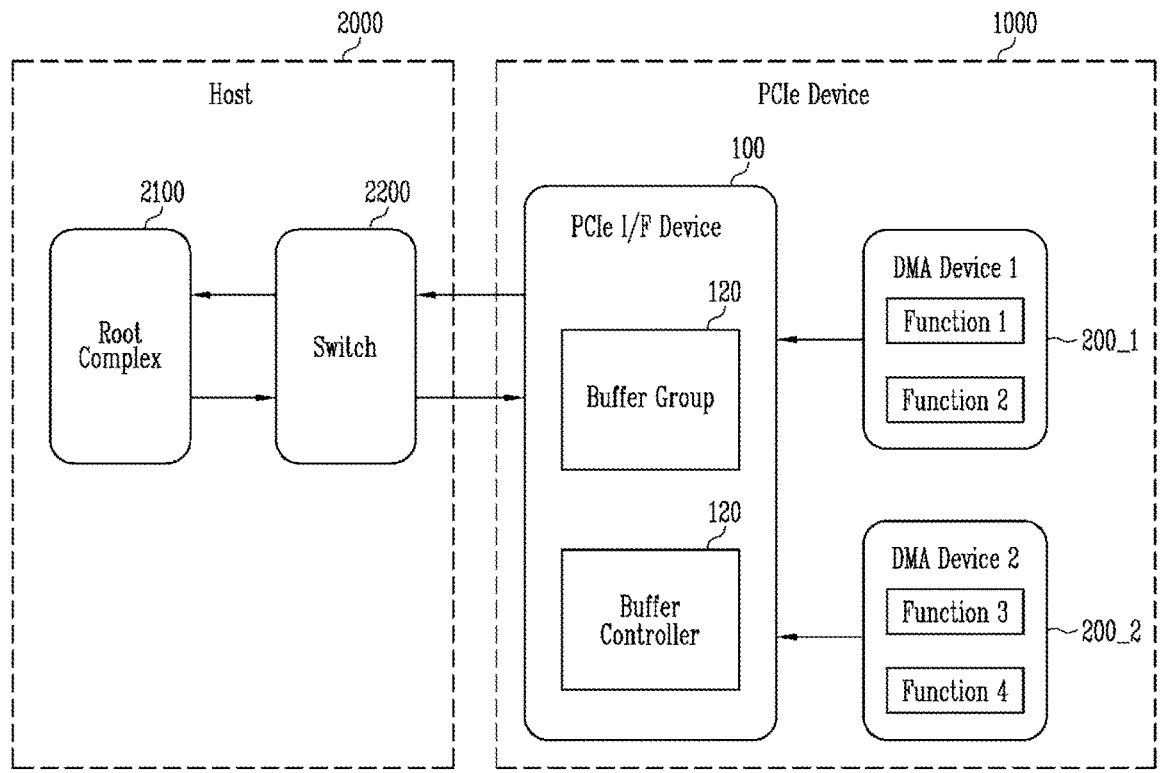
FIG. 11 illustrates the configuration and operation of a PCIe device according to an embodiment of the present disclosure.

FIG. 11 illustrates the configuration and operation of a PCIe device according to an embodiment of the present disclosure.

Referring to FIG. 11, a PCIe device 1000 may include a PCIe interface (I/F) device 100 and at least one Direct Memory Access (DMA) device.

The PCIe interface device 100 may include a buffer group 120 and a buffer controller 130.

The buffer group 120 may store transaction layer packets that are transmitted and received between a switch 2200 of a host 2000 and a function of the DMA device. The buffer group 120 may store a first transaction layer packet received from the function executed on the DMA device. The buffer group 120 may transmit the first transaction layer packet to the switch 2200. Meanwhile, the buffer group 120 may store a second transaction layer packet received from the switch

2200. The buffer group 120 may transmit the second transaction layer packet to the function of the DMA device.

The buffer controller 130 may control an order of outputting a plurality of transaction layer packets, stored in the buffer group 120, to the switch 2200. In addition, the buffer controller 130 may realign the outputting order of the plurality of transaction layer packets.

In an embodiment, the DMA device may include a NonVolatile Memory Express (NVMe) module, an Ethernet card, a sound card, a graphics card, an Artificial Intelligence Central Processing Unit (AI CPU) module, an Artificial Intelligence System on Chip (AI SoC) module, or the like. The DMA device may further include a data communication device coupled to the NVMe module, the Ethernet card, the sound card, the graphics card, the AI CPU module, the AI SoC module, or the like.

In FIG. 11, the PCIe device 1000 may include a plurality of DMA devices, e.g., first and second DMA devices 200_1 and 200_2. The number of DMA devices included in the PCIe device 1000 is not limited to the present embodiment.

For each DMA device, at least one function may be executed. For example, referring to FIG. 11, a first function (Function 1) and a second function (Function 2) may be executed on the first DMA device 200_1, and a third function (Function 3) and a fourth function (Function 4) may be executed on the second DMA device 200_2. The number of functions executed on each DMA device is not limited to the present embodiment.

For example, the PCIe device 1000 may generate a physical function or a virtual function in response to a virtualization request received from the host 2000. The PCIe device 1000 may allocate one or more functions to each DMA device. The number of functions allocated to and executed on each DMA device may be individually set. Therefore, a plurality of functions may be allocated to one DMA device, and each function may be executed as an independent operation unit.

Figure 12:
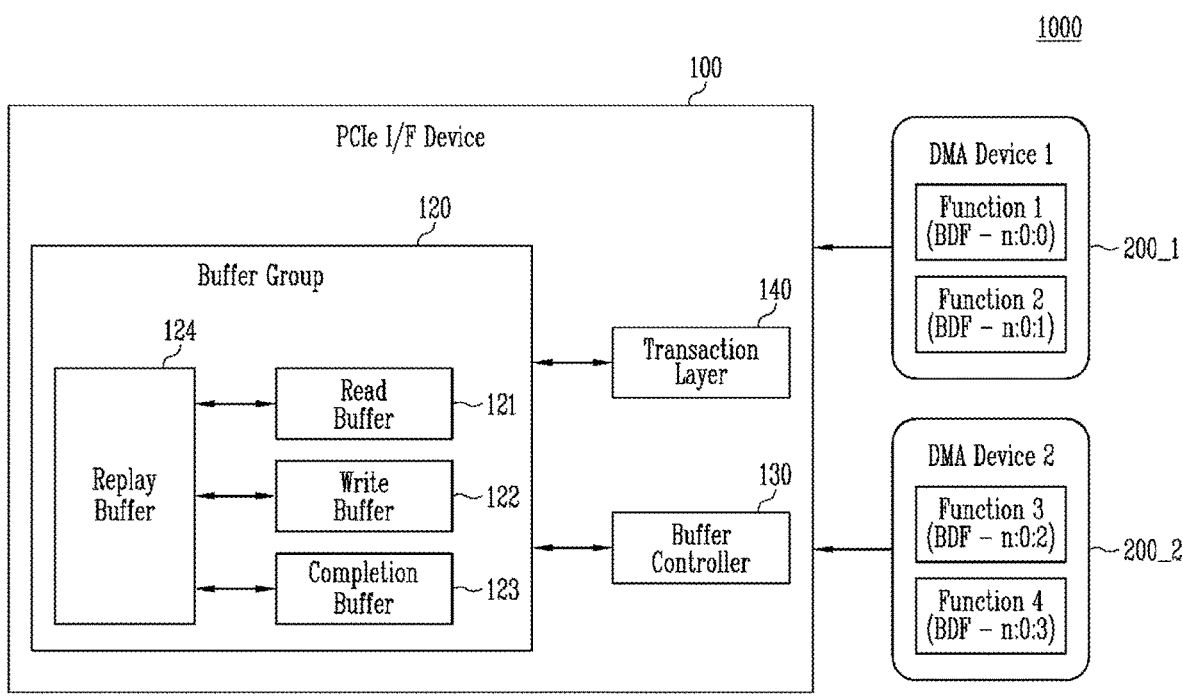
FIG. 12 illustrates the configuration and operation of a PCIe interface device according to an embodiment of the present disclosure.

FIG. 12 illustrates the configuration and operation of a PCIe interface device according to an embodiment of the present disclosure.

Referring to FIG. 12, a PCIe device 1000 may include a PCIe interface device 100 and a plurality of DMA devices 200_1 and 200_2.

The PCIe interface device 100 may include a buffer group 120, a buffer controller 130, and a transaction layer 140.

The buffer group 120 may transmit a transaction layer packet, received from a function of each DMA device through the transaction layer 140, to the switch 2200 of the host 2000 described above with reference to FIG. 11. The buffer group 120 may transmit a transaction layer packet, received from the switch 2200 through the transaction layer 140, to a function of a corresponding DMA device.

In FIG. 12, the buffer group 120 may include a read buffer 121, a write buffer 122, a completion buffer 123, and a replay buffer 124. Each of the read buffer 121, the write buffer 122, and the completion buffer 123 may include a transmission buffer which transmits a stored transaction layer packet to the switch 2200, and a reception buffer which stores a transaction layer packet received from the switch 2200. In an embodiment, the buffer group 120 may transmit and receive a transaction layer packet directly to and from a root complex 2100 of the host 2000.

The read buffer 121 may store a transaction layer packet related to a read request. The write buffer 122 may store a transaction layer packet related to a write request. The completion buffer 123 may store a transaction layer packet related to completion of the read request or the write request. Completion may indicate whether the read request or the write request has been received and processing of the read request or the write request has been completed or not.

Transaction layer packets stored in the read buffer 121, the write buffer 122, and the completion buffer 123, respectively, may be transmitted to the replay buffer 124. An order in which transaction layer packets are transmitted from the read buffer 121, the write buffer 122, and the completion buffer 123 to the replay buffer 124 may be changed by the buffer controller 130.

The replay buffer 124 may output the transaction layer packets to the switch 2200 in the order in which the transaction layer packets are transmitted from the read buffer 121, the write buffer 122, and the completion buffer 123 to the replay buffer 124. The order in which the transaction layer packets, stored in the replay buffer 124, are output to the switch 2200 may be fixed without being changed during operation.

The buffer controller 130 may realign the outputting order of the transaction layer packets stored in the read buffer 121 and the write buffer 122 based on identifications (IDs) of the transaction layer packets.

Here, the transaction layer packets may be packets for which ID-Based Ordering (IDO) is allowed. In a header of each transaction layer packet for which the IDO is allowed, an IDO bit may be set to 1. The transaction layer packets for which the IDO is allowed may be independently determined depending on transactions between devices, and then ordering thereof may be changed in the root complex 2100 or the switch 2200. In another embodiment, the ordering of the transaction layer packets for which the IDO is allowed may be changed by the PCIe device 1000.

An ID of each transaction layer packet may include an identification number of a bus, an identification number of a device, and an identification number of a function, which correspond to the transaction layer packet.**

For example, the PCIe interface device 100 may receive a transaction layer packet from at least one DMA device through at least one bus. An identification number of the bus corresponding to the transaction layer packet may be a number allocated by the host 2000 described above with reference to FIG. 1. An identification number of a device corresponding to the transaction layer packet may be an identification number of the PCIe device 1000. An identification number of a function corresponding to the transaction layer packet may be a unique number of each function implemented in the PCIe device 1000.

In FIG. 12, the identification number of the bus may be n (where n is a natural number), and the identification number of the PCIe device 1000 may be 0. Respective identification numbers of first to fourth functions may be 0 to 3, respectively. Therefore, an ID of a transaction layer packet received from the first function executed on the first DMA device 200_1 may be (n:0:0). An ID of a transaction layer packet received from the second function executed on the first DMA device 200_1 may be (n:0:1). An ID of a transaction layer packet received from the third function executed on the second DMA device 200_2 may be (n:0:2). An ID of a transaction layer packet received from the fourth function executed on the second DMA device 200_2 may be (n:0:3).

Figure 13:
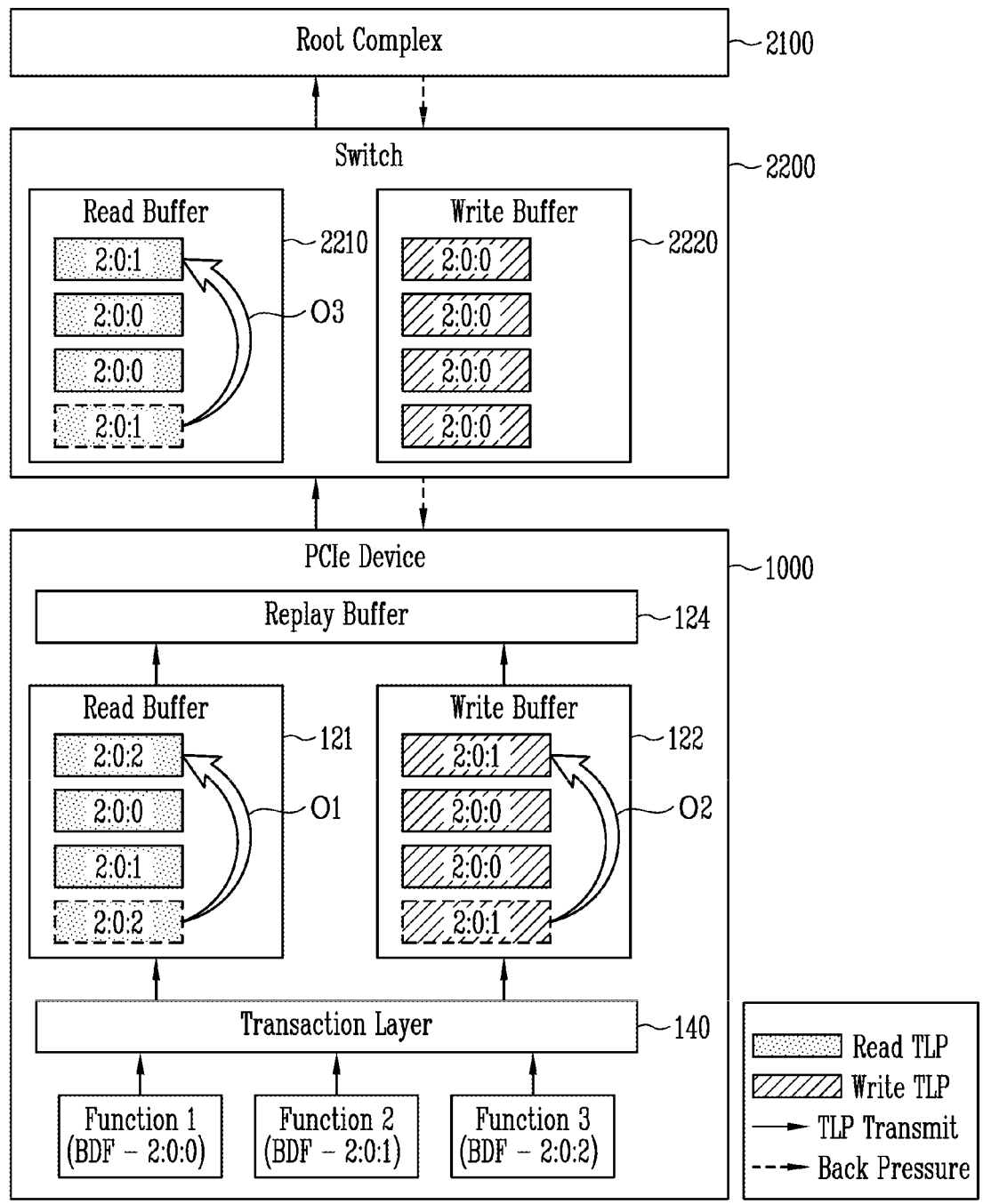
FIG. 13 describes ordering realignment for transaction layer packets based on IDs of the transaction layer packets in a PCIe device.

FIG. 13 describes ordering realignment for transaction layer packets based on IDs of the transaction layer packets in a PCIe device.

Referring to FIG. 13, a read buffer 2210 and a write buffer 2220 of a switch 2200 can each store four transaction layer packets. However, the number of transaction layer packets that can be stored in each buffer is not limited to the present embodiment.

In FIG. 13, the write buffer 2220 of the switch 2200 stores four first transaction layer packets, and thus it is full of the transaction layer packets. The read buffer 2210 of the switch 2200 stores three second transaction layer packets, and thus it is capable of additionally store one new transaction layer packet.

A PCIe device 1000 may include a first buffer and a second buffer.

The first buffer may receive a plurality of first transaction layer packets from multiple functions (e.g., Function 1 to Function 3) of DMA devices through a transaction layer 140. The second buffer may receive a plurality of second transaction layer packets from the multiple functions (Function 1 to Function 3) of the DMA devices through the transaction layer 140.

In FIG. 13, the first buffer may be a write buffer 122, and the second buffer may be a read buffer 121. The first transaction layer packets may be transaction layer packets related to a write request, and the second transaction layer packets may be transaction layer packets related to a read request.

In another embodiment, the first buffer may be the read buffer 121, and the second buffer may be the write buffer 122. The first transaction layer packets may be transaction layer packets related to a read request, and the second transaction layer packets may be transaction layer packets related to a write request.

In FIG. 13, an identification number of a bus may be 2, and an identification number of the PCIe device 1000 may be 0. Respective identification numbers of the first to third functions (Function 1 to Function 3) may be 0 to 2. Therefore, an ID of the transaction layer packet received from the first function (Function 1) may be (2:0:0). An ID of the transaction layer packet received from the second function (Function 2) may be (2:0:1). An ID of the transaction layer packet received from the third function (Function 3) may be (2:0:2).

A root complex 2100 and the switch 2200 may exchange a flow control signal with each other. The switch 2200 and the PCIe device 1000 may exchange a flow control signal with each other.

The flow control signal may include Update FC (Flow Control). When a transaction layer packet is routed from a first side to a third side through a second side, Update FC may be a PCIe protocol by which the second side informs the first side of a state in which the second side is capable of newly receiving a transaction layer packet (TLP). In other words, when the second side is ready to transmit a transaction layer packet received from the first side to the third side, the second side may transmit the Update FC to the first side.

The PCIe device 1000 may determine, based on the flow control signal, whether the switch 2200 is in a state in which a first buffer of the switch 2200 is full and thus incapable of receiving a new transaction layer packet, that is, the first buffer of the switch 2200 is under back pressure. In FIG. 13, the first buffer of the switch 2200 may be the write buffer 2220, and a second buffer thereof may be the read buffer 2210. In another embodiment, the first buffer of the switch 2200 may be the read buffer 2210, and the second buffer thereof may be the write buffer 2220.

The PCIe device 1000 may allocate respective priorities to the plurality of second transaction layer packets in an order in which the second transaction layer packets are input from the multiple functions (Function 1 to Function 3) to the read buffer 121.

When the write buffer 2220 of the switch 2200 is full, the PCIe device 1000 may realign an order in which the plurality of second transaction layer packets are to be output from the read buffer 121 of the PCIe device 1000 to the switch 2200, based on the respective IDs of the second transaction layer packets.

In a first ordering realignment (01) process, the PCIe device 1000 may set priorities of second target transaction layer packets, among the plurality of second transaction layer packets stored in the read buffer 121, to be higher than those of the remaining second transaction layer packets.

In an embodiment, the second target transaction layer packets may be transaction layer packets having IDs different from those of transaction layer packets pending in the write buffer 2220 of the switch 2200.

For example, the IDs of the transaction layer packets pending in the write buffer 2220 of the switch 2200 may be (2:0:0). Among the IDs of the second transaction layer packets stored in the read buffer 121, IDs different from (2:0:0) may be (2:0:1) and (2:0:2).

Therefore, among the plurality of second transaction layer packets, the second transaction layer packets having (2:0:1) and (2:0:2) as IDs may be set to be the second target transaction layer packets having priorities higher than those of the second transaction layer packets having (2:0:0) as IDs. The second transaction layer packets having higher priorities may be output to the read buffer 2210, which is the second buffer of the switch 2200, prior to the second transaction layer packets having a lower priority.

In another embodiment, the second target transaction layer packets may be transaction layer packets having IDs different from those of the plurality of first transaction layer packets stored in the write buffer 122 of the PCIe device 1000.

For example, the IDs of the plurality of first transaction layer packets stored in the write buffer 122 of the PCIe device 1000 may be (2:0:0) and (2:0:1). Among the IDs of the second transaction layer packets stored in the read buffer 121, IDs different from (2:0:0) and (2:0:1) may be (2:0:2).

Therefore, among the plurality of second transaction layer packets, the second transaction layer packets having (2:0:2) as IDs may be set to be the second target transaction layer packets having a priority higher than those of the second transaction layer packets having (2:0:0) and (2:0:1) as IDs.

Consequently, among the plurality of second transaction layer packets stored in the read buffer 121 of the PCIe device 1000, the priorities of the second transaction layer packets having (2:0:2) that is different from (2:0:0), which is the IDs of the transaction layer packets pending in the write buffer 2220 of the switch 2200, and different from (2:0:0) and (2:0:1), which are the IDs of the plurality of first transaction layer packets stored in the write buffer 122 of the PCIe device 1000, may be set to be higher than those of the remaining second transaction layer packets having (2:0:0) and (2:0:1) as IDs.

The priorities of the second target transaction layer packets having IDs different from those of the transaction layer packets pending in the write buffer 2220 of the switch 2200 may be realigned such that the second target transaction layer packets are output from the read buffer 121 of the PCIe device 1000 to the read buffer 2210 of the switch 2200, prior to the remaining second transaction layer packets.

The reason for this is that the write buffer 2220 of the switch 2200 is under back pressure, but the read buffer 2210 is capable of receiving a new transaction layer packet, and thus the second target transaction layer packets having IDs different from those of the transaction layer packets pending in the write buffer 2220 are output to the read buffer 2210 of the switch 2200 to thereby achieve QoS for each function. In other words, the reason for this is to preferentially process transaction layer packets having IDs different from those of transaction layer packets under back pressure by independently realigning the outputting order depending on the IDs of the transaction layer packets.

However, even if the outputting order is realigned depending on the IDs of the transaction layer packets, an outputting order between a first transaction layer packet and a second transaction layer packet having the same ID must be kept.

The PCIe device 1000 may realign an order in which the plurality of first transaction layer packets are to be output from the write buffer 122 based on respective IDs of the plurality of first transaction layer packets.

In a second ordering realignment (O2) process, the PCIe device 1000 may set priorities of first target transaction layer packets, among the plurality of first transaction layer packets stored in the first buffer, e.g., the write buffer 122, to be higher than those of the remaining first transaction layer packets.

The first target transaction layer packets may be transaction layer packets having IDs different from those of transaction layer packets pending in the write buffer 2220 of the switch 2200.

For example, the IDs of the transaction layer packets pending in the write buffer 2220 of the switch 2200 may be (2:0:0). Among the IDs of the first transaction layer packets stored in the write buffer 122, an ID different from (2:0:0) may be (2:0:1).

Priorities may be realigned such that the first transaction layer packets having (2:0:1) different from (2:0:0) of the transaction layer packets pending in the write buffer 2220 of the switch 2200 are output from the write buffer 122 of the PCIe device 1000 to the write buffer 2220 of the switch 2200, prior to the remaining first transaction layer packets.

The reason for this is to realign priorities so that first transaction layer packets having IDs different from those of the transaction layer packets pending in the write buffer 2220 of the switch 2200 are first output to the write buffer 2220, thus preventing transaction layer packets having the ID (2:0:0) from being successively processed.

That is, transaction layer packets having IDs different from those of transaction layer packets under back pressure are first processed, thus preventing an occupation rate of transaction layer packets having a specific ID from excessively increasing, and achieving QoS for each function.

Similarly to the first ordering realignment (O1) process, the switch 2200 may realign priorities of the transaction layer packets stored in the read buffer 2210 in a third ordering realignment (O3) process.

In accordance with an embodiment of the present disclosure, the PCIe device 1000 may independently change the outputting order of transaction layer packets depending on IDs of the transaction layer packets. That is, not only the root complex 2100 and the switch 2200 but also the PCIe device 1000 may change the outputting order of the transaction layer packets for which the IDO is allowed, thus more efficiently achieving QoS for each function.

Figure 14:
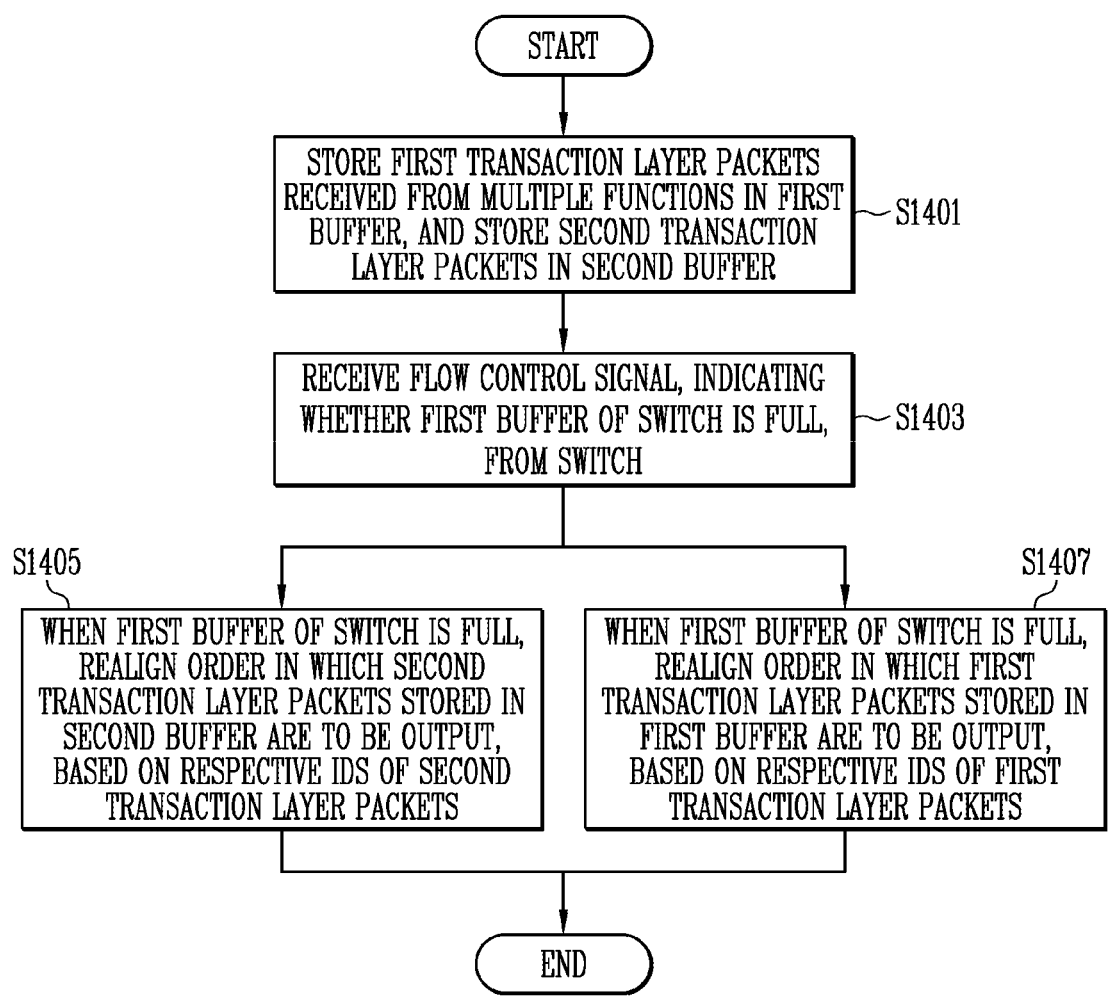
FIG. 14 is a flowchart illustrating an operation of a PCIe interface device according to an embodiment of the present disclosure.

FIG. 14 is a flowchart illustrating an operation of a PCIe interface device according to an embodiment of the present disclosure.

Referring to FIG. 14, at S1401, the PCIe interface device may store first transaction layer packets received from multiple functions of DMA devices in a first buffer, and may store second transaction layer packets received from the multiple functions of the DMA devices in a second buffer.

In an embodiment, the first buffer may be a write buffer, the second buffer may be a read buffer, the first transaction layer packets may be packets related to a write request, and the second transaction layer packets may be packets related to a read request.

In another embodiment, the first buffer may be the read buffer, the second buffer may be the write buffer, the first transaction layer packets may be packets related to the read request, and the second transaction layer packets may be packets related to the write request.

At S1403, the PCIe interface device may receive a flow control signal, indicating whether a first buffer of a switch is full, from the switch. The first buffer of the switch may be a write buffer. In an embodiment, the PCIe interface device may receive a flow control signal, indicating whether the first buffer of the switch is capable of receiving a new transaction layer packet, from the switch. The PCIe interface device may determine, based on the flow control signal, whether the first buffer of the switch is full or capable of receiving a new transaction layer packet.

At S1405, when the first buffer of the switch is full, the PCIe interface device may realign an order in which the second transaction layer packets stored in the second buffer of the PCIe interface device are to be output to the switch, based on respective IDs of the second transaction layer packets.

At S1407, when the first buffer of the switch is full, the PCIe interface device may realign an order in which the first transaction layer packets stored in the first buffer of the PCIe interface device are to be output to the switch, based on respective IDs of the first transaction layer packets.

Figure 15:
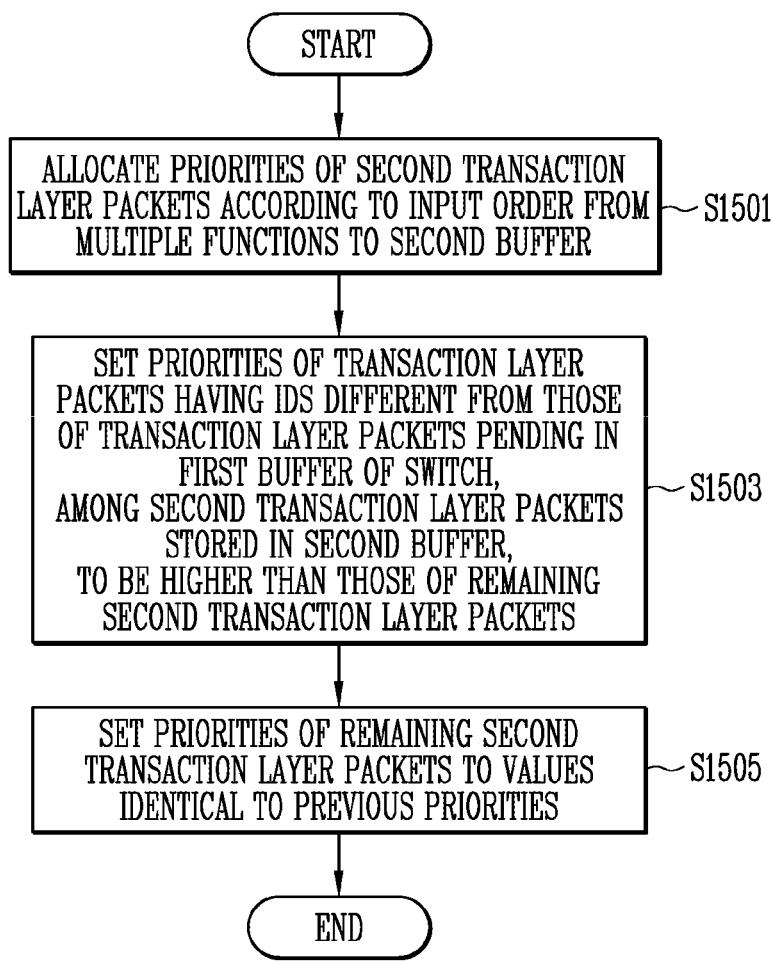
FIG. 15 is a flowchart illustrating an operation of a PCIe interface device according to an embodiment of the present disclosure.

FIG. 15 is a flowchart illustrating an operation of a PCIe interface device according to an embodiment of the present disclosure.

Referring to FIG. 15, at S1501, the PCIe interface device may allocate priorities of second transaction layer packets according to an order in which the second transaction layer packets are input from multiple functions to a second buffer of the PCIe interface device.

At S1503, the PCIe interface device may set priorities of second transaction layer packets having IDs different from those of transaction layer packets pending in a first buffer of a switch, among the second transaction layer packets stored in the second buffer, to be higher than those of the remaining second transaction layer packets.

At S1505, the PCIe interface device may set the priorities of the remaining second transaction layer packets to values identical to previous priorities thereof.

3. A PCIe device capable of limiting performance for each function and a method of operating the PCIe device.

Figure 16:
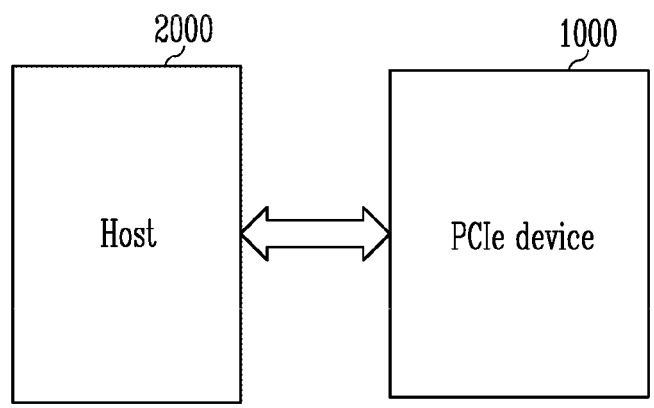
FIG. 16 illustrates a computing system according to an embodiment of the present disclosure.

FIG. 16 illustrates a computing system 100 according to an embodiment of the present disclosure.

Referring to FIG. 16, the computing system 100 may include a host 2000 and a Peripheral Component Interconnect Express (PCIe) device 2000. For example, the computing system 100 may be a mobile phone, a smartphone, an MP3 player, a laptop computer, a desktop computer, a game console, a TV, a tablet PC, an in-vehicle infotainment system, or the like.

The host 2000 may control processing of data and operations of the computing system 100. The host 2000 may store data, commands, and/or program codes required for the operations of the computing system 100.

The host 2000 may include an input/output control module which couples input/output devices to each other. For example, the input/output control module may include one or more of a Universal Serial Bus (USB) adapter, a Peripheral Component Interconnect (PCI) or PCI Express (PCIe) adapter, a Small Computer System Interface (SCSI) adapter, a Serial AT Attachment (SATA) adapter, a NonVolatile Memory express (NVMe) adapter, etc. The host 2000 may communicate information with devices coupled to the computing system 100 through the input/output control module.

PCI defines a bus protocol used to couple the input/output devices to each other. PCIe has the concept of programming defined in a PCI standard and defines a physical communication layer as a high-speed serial interface.

The PCIe device 1000 may communicate with the host 2000 using PCIe. For example, the PCIe device 1000 may be implemented in various I/O device types, such as a network and a storage.

In an embodiment, the PCIe device 1000 may be defined as an endpoint or a device including the endpoint.

The endpoint denotes a type of a function that can be a requester or completer of a PCIe transaction. The endpoint may be classified as a legacy endpoint, a PCIe endpoint, or a Root Complex Integrated Endpoint (RCiEP).

The legacy endpoint may be a function having a type 00h configuration space header. The legacy endpoint may support a configuration request as a completer. The legacy endpoint may support an input/output (I/O) request as a completer. The legacy endpoint may accept I/O requests for either or both of 80*h* and 84*h* locations regardless of an I/O decoding configuration of the corresponding endpoint. The legacy endpoint may generate I/O requests. The legacy endpoint should not issue a locked request. The legacy endpoint may implement extended configuration space capabilities.

A legacy endpoint, functioning as a requester of a memory transaction, is not required to generate addresses above (or equal to) 4 GB. When an interrupt resource is requested, the legacy endpoint is required in order to support either or both of Message Signaled Interrupt (MSI) and MSI-X. When the message signaled interrupt (MSI) is implemented, the legacy endpoint may support a 32-bit or 64-bit message address version of an MSI function structure. The legacy endpoint may support 32-bit address allocation for a base address register which requests memory resources. The legacy endpoint may appear in any one of hierarchy domains originated by a root complex.

The PCIe endpoint may be a function having a type 00h configuration space header. The PCIe endpoint may support a configuration request as a completer. The PCIe endpoint should not depend on the operating system (OS) allocation of I/O resources, which is requested through a base address register (BAR). The PCIe endpoint cannot generate an I/O request. The PCIe endpoint can neither support a locked request as a completer nor generate a locked request as a requester. A PCIe-compatible software driver and application may be created not to use lock semantics when accessing the PCIe endpoint.

A PCIe endpoint, functioning as a requester of a memory transaction, may generate addresses above 4 GB. When an interrupt resource is requested, the PCIe endpoint may be required in order to support either or both of MSI and MSI-X. When the MSI is implemented, the PCIe endpoint may support a 64-bit message address version of an MSI function structure. A minimum memory address range requested by the base address register may be 128 bytes. The PCIe endpoint may appear in any one of hierarchy domains originated by a root complex.

The Root Complex Integrated Endpoint (RCiEP) may be implemented in internal logic of a root complex including a root port. The RCiEP may be a function having a type 00h configuration space header. The RCiEP may support a configuration request as a completer. The RCiEP may not require I/O resources requested through a base address register. The RCiEP may not generate I/O requests. The RCiEP can neither support a locked request as a completer nor generate a locked request as a requester. A PCIe-compatible software driver and application may be created not to use lock semantics when accessing the RCiEP. The RCiEP, functioning as a requester of a memory transaction, may generate addresses having capacity equal to or greater than that of addresses that can be processed by the host 2000 that is a completer.

When an interrupt resource is requested, the RCiEP is required in order to support either or both of MSI and MSI-X. When the MSI is implemented, the RCiEP is allowed to support a 32-bit or 64-bit message address version of an MSI function structure. The RCiEP may support 32-bit address allocation for a base address register which requests memory resources. The RCiEP cannot implement link capabilities, link status, link control, link capabilities 2, link status 2, and link control 2 registers in PCI express extended capability. The RCiEP may not implement active status power management. The RCiEP may not be entirely and independently hot-plugged with a root complex. The RCiEP may not appear in hierarchy domains exposed by the root complex. The RCiEP may not appear in switches.

In an embodiment, the PCIe device 1000 may generate one or more virtual devices. For example, the PCIe device 1000 may store program codes for generating one or more virtual devices.

In an embodiment, the PCIe device 1000 may generate a physical function (PF) device or a virtual function (VF) device based on a virtualization request received from the host 2000. For example, the physical function device may be set to a virtual device that can be accessed by a virtualization intermediary of the host 2000. The virtual function device may be set to a virtual device allocated to a virtual machine of the host 2000.

Figure 17:
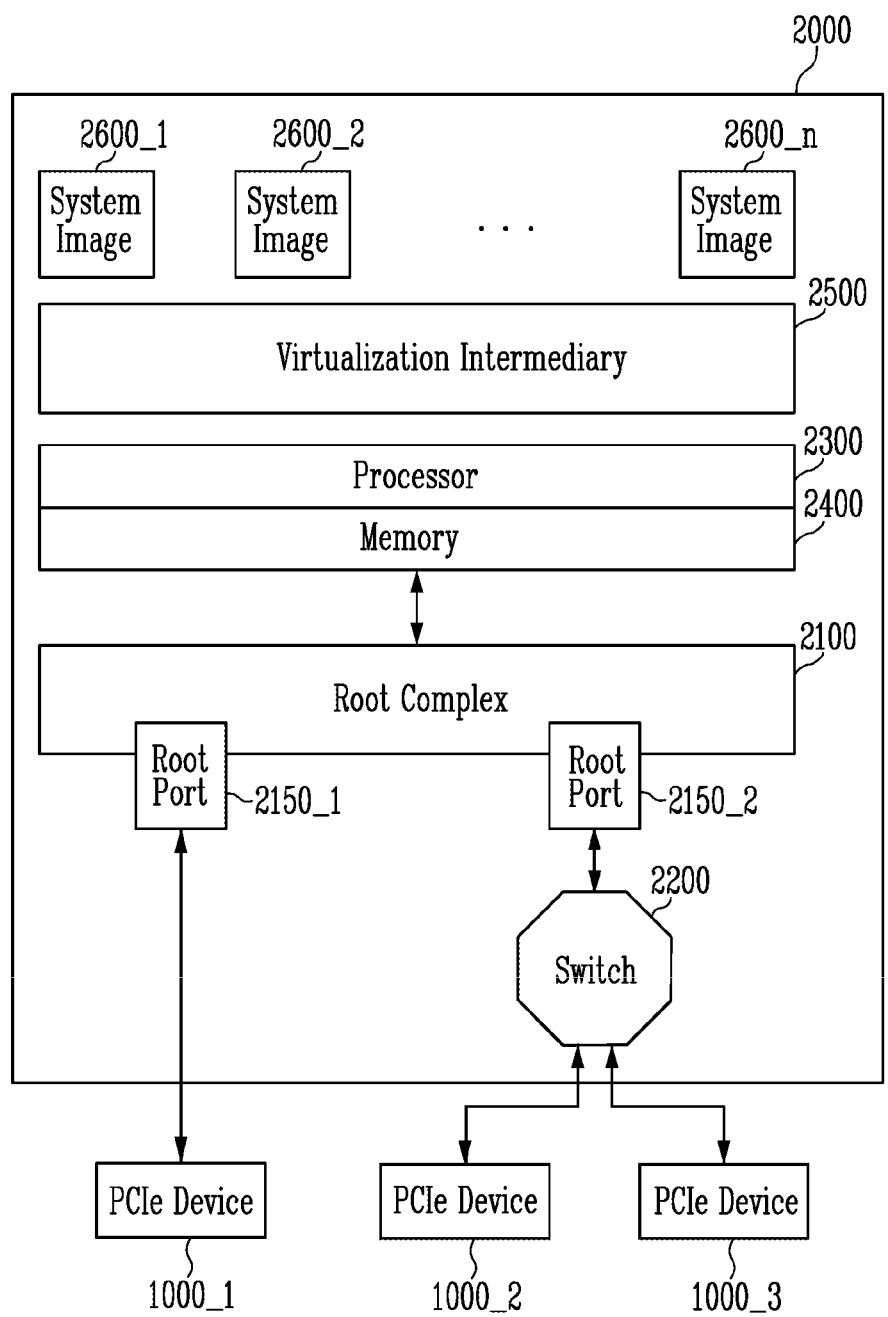
FIG. 17 illustrates a host of FIG. 17.

FIG. 17 illustrates the host of FIG. 16.

In an embodiment, FIG. 17 illustrates the host 2000 in which PCIe is available.

Referring to FIG. 17, the host 2000 may include a plurality of system images 2600_1 to 2600_*n*, a virtualization intermediary 2500, a processor 2300, a memory 2400, a root complex 2100, and a switch 1060, n being a positive integer. In the present disclosure, the term "processor" may be used interchangeably with "CPU".

In an embodiment, each of a plurality of PCIe devices 1000_1 to 1000_3 may correspond to the PCIe device 1000 of FIG. 16.

The system images 2600_1 to 2600_*n* may be software components executed on a virtual system to which PCIe functions may be allocated. In an embodiment, the system images 2600_1 to 2600_*n* may be referred to as virtual machines. The system images 2600_1 to 2600_*n* may be software such as an operating system used to execute applications or trusted services. For example, the system images 2600_1 to 2600_*n* may be composed of a guest operating system (Guest OS), a shared or non-shared I/O device driver, etc. In order to improve the efficiency of hardware resource utilization without modifying hardware, the plurality of system images 2600_1 to 2600_n may be executed on the computing system 100.

In an embodiment, a PCIe function may be an independent operation unit which provides physical resources included in the PCIe devices 1000_1 to 1000_3. In the present specification, the term "PCIe function" and the term "function" may be used to have the same meaning.

The virtualization intermediary 2500 may be a software component that supports the plurality of system images 2600_1 to 2600_n. In an embodiment, the virtualization intermediary 2500 may be referred to as a hypervisor or a virtual machine monitor (VMM). The virtualization intermediary 2500 may be interposed between hardware, such as the processor 2300 and the memory 2400, and the system images 2600_1 to 2600_n. Input/output (I/O) operations (inbound or outbound I/O operations) in the computing system 100 may be intercepted and processed by the virtualization intermediary 2500. The virtualization intermediary 2500 may present respective system images 2600_1 to 2600_n having their own virtual systems by abstracting hardware resources. Actual hardware resources usable in the respective system images 2600_1 to 2600_n may vary with a workload or customer-specific policies.

The processor 2300 may include circuits, interfaces, or program codes, which perform data processing and control operations of the components of the computing system 100. For example, the processor 2300 may include a central processing unit (CPU), an Advanced RISC Machine (ARM), an application specific integrated circuit (ASIC), or the like.

The memory 2400 may include a volatile memory such as an SRAM, a DRAM, or the like, which stores data, commands, and/or program codes required for the operations of the computing system 100. Also, the memory 2400 may include a nonvolatile memory. In an embodiment, the memory 2400 may also store program codes that are operable to execute one or more operating systems (OS) and virtual machines (VM), and program codes that run the virtualization intermediary (VI) 2500 for managing the virtual machines.

The processor 2300 may run one or more operating systems and virtual machines by executing the program codes stored in the memory 2400. Further, the processor 2300 may run the virtualization intermediary 2500 for managing the virtual machines. In this manner, the processor 2300 may control the operations of the components of the computing system 100.

The root complex 2100 indicates a root of an I/O hierarchy structure which couples the processor 2300/memory 2400 to I/O ports.

The computing system 100 may include one or more root complexes. Further, each root complex 2100 may include one or more root ports, e.g., 2150_1 and 2150_2. The root ports 2150_1 and 2150_2 denote separate hierarchies. The root complex 2100 may communicate with the switch 1060 or the PCIe devices 1000_1 to 1000_3 through the root ports 2150_1 and 2150_2.

A function of routing a peer-to-peer transaction between hierarchy domains through the root complex 2100 is optional. Each hierarchy domain may be implemented as a sub-hierarchy including either a single endpoint or one or more switches and an endpoint.

The root complex 2100 may split a packet into smaller packets when routing the peer-to-peer transaction between the hierarchy domains. For example, the root complex 2100 may split a single packet having a 256-byte payload into two packets, each having a 128-byte payload. An exception to this is that the root complex 2100, which supports peer-to-m peer routing of Vendor_Defined Messages (VDMs), is not allowed to split each vendor-defined message packet into smaller packets except at 128-byte boundaries (i.e., all result packets except a last packet should have a payload size of integer multiples of 128 bytes).

The root complex 2100 should support the generation of a configuration request as a requester. The root complex 2100 may support the generation of an I/O request as a requester.

The root complex 2100 should not support lock semantics as a completer. The root complex 2100 may support the generation of a locked request as a requester.

The switch 1060 may be defined as a logical assembly of various virtual PCI-PCI bridge devices. The switch 1060 may communicate with the PCIe devices 1000_2 and 1000_3 coupled thereto.

The switch 1060 is indicated by two or more logical PCI-PCI bridges in configuration software.

The switch 1060 may transfer transactions using a PCI bridge mechanism. The switch 1060 may transfer all types of Transaction Layer Packets (TLP) between all port sets. The switch 1060 may support a locked request.

The switch 1060 cannot split a packet into smaller packets.

Arbitration between ingress ports of the switch 1060 may be implemented in a round robin or weighted round robin manner when contention occurs in the same virtual channel.

The endpoint should not be represented in configuration software in an internal bus of the switch 1060, as a peer in a virtual PCI-PCI bridge indicating a switch downstream port.

Figure 18:
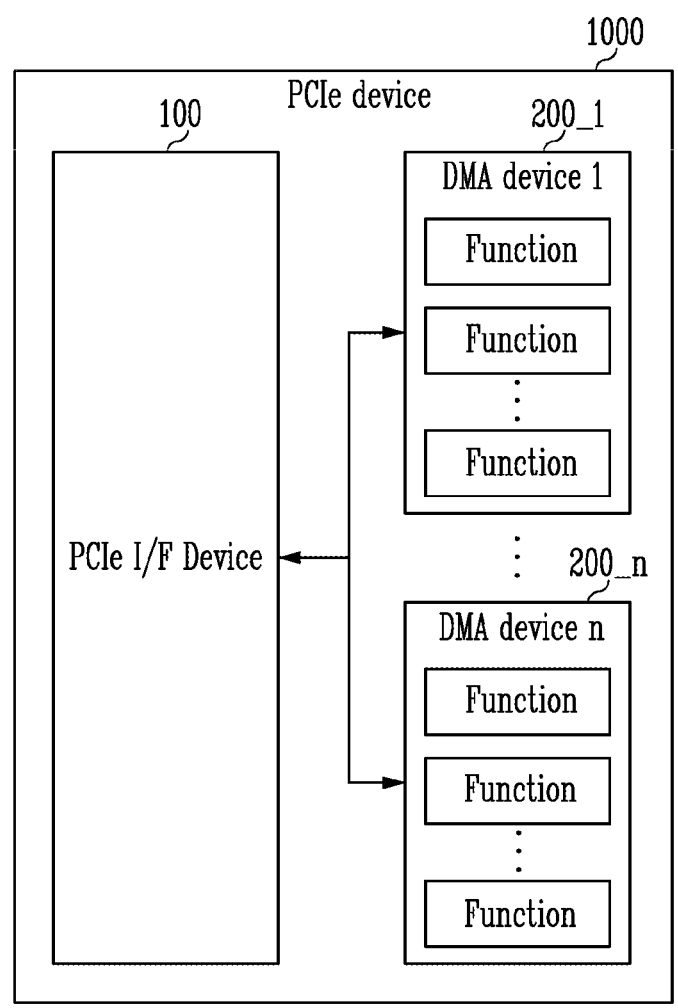
FIG. 18 illustrates a PCIe device of FIG. 17.

FIG. 18 illustrates the PCIe device of FIG. 16.

Referring to FIG. 18, the PCIe device 1000 may include a PCIe interface(I/F) device 100 and a plurality of Direct Memory Access (DMA) devices 200_1 to 200_n.

The PCIe interface device 100 may receive transaction layer packets from a plurality of functions that are executed in the plurality of DMA devices 200_1 to 200_n. The PCIe interface device 100 may deliver the transaction layer packets received from the respective functions to the host 2000 of FIG. 16.

The types of the DMA devices 200_1 to 200_n may include a NonVolatile Memory Express (NVMe) device, a Solid State Drive (SSD) device, an Artificial Intelligence Central Processing Unit (AI CPU), an Artificial Intelligence System on Chip (AI SoC), an Ethernet device, a sound card, a graphics card, etc. The types of the DMA devices 200_1 to 200_n are not limited thereto, and may include other types of electronic devices employing a PCIe interface. Functions may be executed on the DMA devices 200_1 to 200_n, and may be software or firmware which processes transactions of transaction layer packets.

Functions may be executed on each of the DMA devices 200_1 to 200_n. For example, each of the DMA devices 200_1 to 200_n may include one or more functions executed thereon. Here, the number of functions executed on each of the DMA devices 200_1 to 200_n may vary according to embodiments. The PCIe device 1000 may generate a physical function or a virtual function in response to a virtualization request received from the host 2000. The PCIe device 1000 may allocate the functions to the respective DMA devices 200_1 to 200_n. The number of functions allocated to and executed on each of the DMA devices 200_1 to 200_n may be individually set. Therefore, one or more functions may be allocated to one DMA device (e.g., one of 200_1 to 200_n), and each function may be executed as an independent operation unit.

Figure 19:
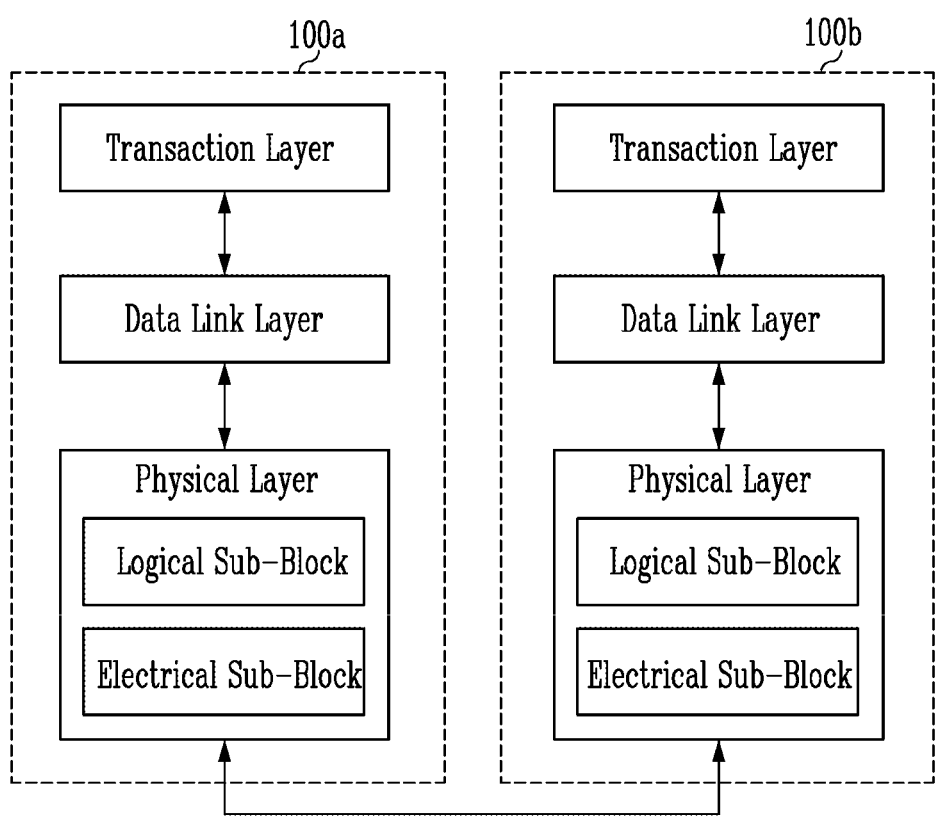
FIG. 19 illustrates a structure of layers included in a PCIe interface device of FIG. 18.

FIG. 19 illustrates a structure of layers included in a PCIe interface device.

Referring to FIG. 19, a first PCIe interface device 100a and a second PCIe interface device 100b are illustrated. Each of the first PCIe interface device 100a and the second PCIe interface device 100b may correspond to the PCIe interface device 100 of FIG. 18.

PCIe layers included in each of the first and second PCIe interface devices 100a and 100b may include three discrete logical layers. For example, the PCIe layers may include a transaction layer, a data link layer, and a physical layer. Each of the layers may include two sections. One of the two sections may process outbound information (or information to be transmitted), and the other one may process inbound information (or received information). Further, the first and second PCIe interface devices 100a and 100b may use transaction layer packets so as to communicate information.

In each of the first and second PCIe interface devices 100a and 100b, the transaction layer may assemble and disassemble transaction layer packets. Also, the transaction layer may implement a split transaction that is a transaction for transferring other traffic to a link while a target system is collecting data required for a response. For example, the transaction layer may implement a transaction in which a request and a response are separated by time. In an embodiment, four transaction address spaces may include a configuration address space, a memory address space, an input/output address space, and a message address space. A memory space transaction may include one or more of a read request and a write request to transmit/receive data to/from a memory-mapped place. In an embodiment, the memory space transaction may use two different address formats, e.g., a short address format such as a 32-bit address and a long address format such as a 64-bit address. A configuration space transaction may be used to access a configuration space of a PCIe system. The transaction to the configuration space may include a read request and a write request. A message space transaction (or message) may be defined to support in-band communication between PCIe systems.

The transaction layer may store link configuration information or the like. Further, the transaction layer may generate a transaction layer packet (TLP), or may convert a TLP, received from an external device, into a payload or status information.

The data link layer may perform a link management function and a data integrity function including error detection and error correction. Specifically, a transmission side of the data link layer may accept a TLP assembled by the transaction layer, assign a data protection code to the TLP, and calculate a TLP sequence number of the TLP. Also, the transmission side of the data link layer may transmit the data protection code and the TLP sequence number to the physical layer so as to transmit the corresponding information through a link. A reception side of the data link layer may check the data integrity of a TLP received from the physical layer and transmit the TLP to the transaction layer so as to perform additional processing on the TLP.

The physical layer may include all circuitry for performing interface operations. Here, all circuitry may include a driver, an input buffer, a serial-to-parallel conversion circuit, a parallel-to-serial conversion circuit, a phase-locked loop (PLL), and an impedance matching circuit.

Further, the physical layer may include a logical sub-block and a electrical sub-block for physically transmitting a packet to an external PCIe system. Here, the logical sub-block may take a role that is necessary for a 'digital' function of the physical layer. With regard to this, the logical sub-block may include a transmission section for preparing outgoing information to be transmitted by the electrical sub-block and a reception section for identifying and preparing received information before delivering the received information to the data link layer.

The physical layer may include a transmitter and a receiver. The transmitter may receive symbols from the logical sub-block, serialize the symbols, and transmit the serialized symbols to an external device, e.g., the external PCIe system. Further, the receiver may receive serialized symbols from the external device, and convert the received symbols into a bitstream. The bitstream may be deserialized and supplied to the logical sub-block. That is, the physical layer may convert TLPs received from the data link layer into a serialized format, and may convert packets received from the external device into a deserialized format. Furthermore, the physical layer may include logical functions related to interface initialization and maintenance.

Although the structures of the first and second first PCIe interface devices 100a and 100b are illustrated in FIG. 19, the first and second first PCIe interface devices 100a and 100b may include an arbitrary form, such as a quick-path interconnect structure, a next-generation high-performance computing interconnect structure, or any other hierarchical structure.

Figure 20:
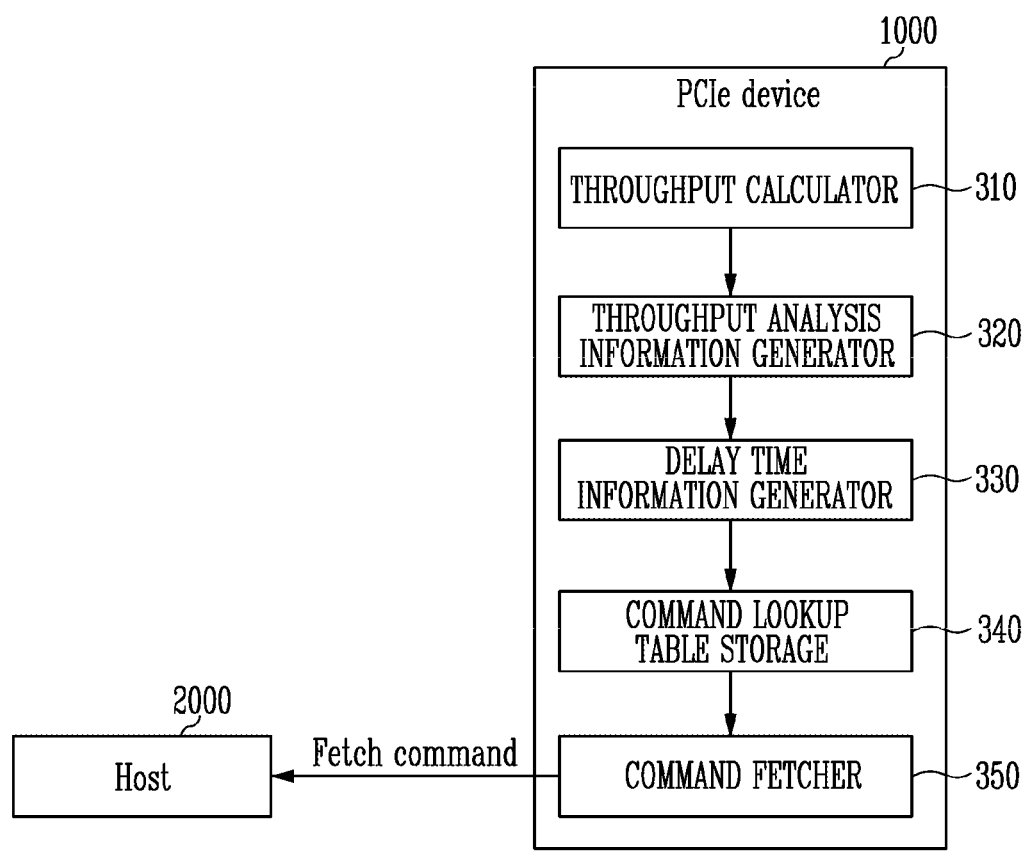
FIG. 20 illustrates a PCIe device according to an embodiment of the present disclosure.

FIG. 20 illustrates a PCIe device 1000 according to an embodiment of the present disclosure.

The PCIe device 1000 may correspond to any of the PCIe devices 2000, 1000_1, 1000_2, and 1000_3 illustrated in FIGS. 1 to 3.

Referring to FIG. 20, the PCIe device 1000 may include a throughput calculator 510, a throughput analysis information generator 320, a delay time information generator 330, a command lookup table storage 340, and a command fetcher 350.

The throughput calculator 310 may calculate a throughput of each of a plurality of functions executed on a plurality of DMA devices. The throughput may be an index indicating the performance of each of the functions. The throughput calculator 310 may periodically calculate the throughput of each of the functions. In an embodiment, the performance analyzer 111 explained in FIG. 2 may include the throughput calculator 310 and the throughput analysis information generator 320.

In an embodiment, the throughput calculator 310 may calculate the throughput based on occupation rates of the plurality of functions for a data path shared between the plurality of functions. In an embodiment, the data path may be a path for coupling a PCIe interface device to the plurality of DMA devices.

For example, the throughput calculator 310 may calculate the occupation rate of each of the plurality of functions based on the number of transaction layer packets of each function processed through the data path per unit time. Each of the plurality of functions may transmit a transaction layer packet, which includes identification information of the corresponding function, through the data path. Accordingly, the throughput calculator 310 may calculate the occupation rate of each of the plurality of functions based on the function identification information included in the transaction layer packets. The throughput calculator 310 may calculate the throughputs of the plurality of functions based on the calculated occupation rates. The throughput calculator 310 may provide the calculated throughputs to the throughput analysis information generator 320.

In an embodiment, the throughput calculator 310 may calculate a read throughput corresponding to a read operation and a write throughput corresponding to a write operation for each of the plurality of functions. Here, the read throughput corresponding to the read operation may be a throughput calculated during the read operation of the corresponding function, and the write throughput corresponding to the write operation may be a throughput calculated during the write operation of the corresponding function. Therefore, the throughput of each of the plurality of functions may include the read throughput corresponding to the read operation and the write throughput corresponding to the write operation.

The throughput analysis information generator 320 may generate throughput analysis information for each of the plurality of functions based on a throughput limit that is set for each of the plurality of functions and the calculated throughput for each of the plurality of functions. For example, the throughput analysis information generator 320 may periodically generate throughput analysis information based on the throughputs provided from the throughput calculator 310.

Here, the throughput limit may be a threshold value set to limit a throughput of each function. For example, the throughput analysis information generator 320 may receive information about the throughput limit of each of the plurality of functions from the host 2000. The throughput analysis information generator 320 may set the throughput limit of each of the plurality of functions depending on the received information about the throughput limit.

Here, the throughput analysis information may be information indicating a result of a comparison between the throughput limit and the calculated throughput. In an embodiment, the throughput analysis information may include at least one of information indicating whether the calculated throughput exceeds the throughput limit, an excess ratio of the calculated throughput to the throughput limit, a residual ratio of the calculated throughput to the throughput limit, information about whether each function is in an idle state, and information about whether the calculated throughput is lower than a minimum performance threshold value set for each function. The throughput analysis information may further include any of various types of information that can be acquired by comparatively analyzing throughputs.

In an embodiment, the excess ratio of the calculated throughput to the throughput limit may be calculated when a throughput calculated for a specific function exceeds a throughput limit set for the specific function. For example, the excess ratio of the calculated throughput to the throughput limit may be represented by the following Equation (1).

$$\text{Excess ratio} = (\text{calculated throughput} - \text{throughput limit})/\text{throughput limit} \quad (1)$$

In an embodiment, the residual ratio of the calculated throughput to the throughput limit may be calculated when the throughput calculated for the specific function does not exceed the throughput limit set for the specific function. For example, the residual ratio of the calculated throughput to the throughput limit may be represented by the following Equation (2).

$$\text{Residual ratio} = (\text{throughput limit} - \text{calculated throughput})/\text{throughput limit} \quad (2)$$

In an embodiment, the throughput analysis information generator 320 may generate read throughput analysis information corresponding to a read operation and write throughput analysis information corresponding to a write operation. For example, the throughput analysis information generator 320 may generate the read throughput analysis information corresponding to the read operation based on a result of a comparison between the throughput and the throughput limit which correspond to the read operation. Further, the throughput analysis information generator 320 may generate the write throughput analysis information corresponding to the write operation based on a result of a comparison between the throughput and the throughput limit which correspond to the write operation. Therefore, the throughput analysis information may include the read throughput analysis information corresponding to the read operation and the write throughput analysis information corresponding to the write operation.

In an embodiment, the minimum performance threshold value may be a threshold value that prevents a latency from occurring during an operation of the specific function. The throughput analysis information generator 320 may set a minimum performance threshold value for each of the plurality of functions.

The throughput analysis information generator 320 may provide the throughput analysis information to the delay time information generator 330.

The delay time information generator 330 may generate a delay time of each of the plurality of functions based on the throughput analysis information. Here, the delay time may be information for delaying a command fetch operation corresponding to each function.

In an embodiment, when the delay time information generator 330 generates a delay time of a function, for which the calculated throughput exceeds the throughput limit, among the plurality of functions, the delay time information generator 330 may increase the delay time of the function based on the excess ratio of the calculated throughput to the throughput limit. For example, the delay time information generator 330 may calculate a delay time increment value by multiplying a first constant value by the excess ratio. Here, the first constant value may be variously set depending on settings by the host 2000. The delay time information generator 330 may calculate a value increased from a previous delay time of the function, which has been previously generated, by the delay time increment value, as a current delay time corresponding to the function.

In an embodiment, when the delay time information generator 330 generates a delay time of a function, for which the calculated throughput does not exceed the throughput limit, among functions having delay times that are greater than an initial value, the delay time information generator 330 may decrease the delay time of the function based on the residual ratio of the calculated throughput to the throughput limit. In an embodiment, the initial value of the delay time may be '0.' For example, the delay time information generator 330 may calculate a delay time decrement value by multiplying a second constant value by the residual ratio. Here, the second constant value may be variously set depending on the settings by the host 2000. The delay time information generator 330 may calculate a value decreased from a previous delay time of the function, which has been previously generated, by the delay time decrement value, as a current delay time of the function.

In an embodiment, the delay time information generator 330 may set a delay time of a function, which is in an idle state, and a delay time of a function, for which the calculated throughput is lower than the minimum performance threshold value, among the plurality of functions, to the initial value. Accordingly, the delay times of those functions may be set to '0.'

In an embodiment, a delay time may include a read delay time corresponding to a read operation and a write delay time corresponding to a write operation. For example, the delay time information generator 330 may generate the read delay time corresponding to the read operation based on the read throughput analysis information corresponding to the read operation. Further, the delay time information generator 330 may generate the write delay time corresponding to the write operation based on the write throughput analysis information corresponding to the write operation.

The delay time information generator 330 may provide the delay time to the command lookup table storage 340.

The command lookup table storage 340 may include a command lookup table. Here, the command lookup table may store command-related information including information related to a target command to be fetched from the host 2000 and a delay time of a function corresponding to the target command, among the plurality of functions. The command lookup table may store command-related information for each of a plurality of target commands. In an embodiment, the command-related information may include an address at which each target command is stored in the host 2000, information indicating whether the corresponding target command is a read command or a write command, identification information of a function assigned to the corresponding target command, etc.

The command lookup table storage 340 may receive the command-related information for the target command from the host 2000. For example, the host 2000 may update a submission queue head doorbell so as to request the PCIe device 1000 to execute the target command. Here, the command lookup table storage 340 may receive the command-related information for the target command, which is requested to be executed, from the host 2000.

In an embodiment, the command lookup table storage 340 may store delay time lapse information by associating the delay time lapse information with the command-related information. Here, the delay time lapse information may be information indicating whether the delay time of the function corresponding to the target command has elapsed from a time point at which the command-related information for the target command is stored in the command lookup table. For example, when the target command is a read command, the delay time lapse information may be generated based on the read delay time corresponding to the read operation. When the target command is a write command, the delay time lapse information may be generated based on the write delay time corresponding to the write operation.

In an embodiment, the command lookup table storage 340 may count a time from a time point at which the command-related information is stored in the command lookup table, and may then check whether the delay time has elapsed. For example, when the delay time of the function has elapsed, the delay time lapse information may include information indicating that the delay time of the function has expired. On the other hand, when the delay time of the function has not elapsed, the delay time lapse information may include information indicating that the delay time of the function has not yet expired.

The command fetcher 350 may fetch a target command from the host 2000 based on command-related information for the target command and a delay time of a function corresponding to the target command.

In an embodiment, the command fetcher 350 may determine whether to fetch the target command based on the delay time lapse information. For example, when it is determined that the delay time of the corresponding function has elapsed from the time point at which the command-related information is stored in the command lookup table based on the delay time lapse information, the command fetcher 350 may send a fetch command to the host 2000 to fetch the target command from the host 2000. On the other hand, when it is determined that the delay time of the corresponding function has not elapsed from the time point at which the command-related information is stored in the command lookup table based on the delay time lapse information, the command fetcher 350 may delay a command fetch operation for the target command. In this case, the command fetcher 350 may skip the command fetch operation for the target command, and may perform a command fetch operation for another target command for which a delay time has elapsed.

In accordance with an embodiment of the present disclosure, a command fetch operation for a target command may be controlled based on delay times assigned to respective functions, and thus limitation in performance for each function may be promptly and accurately performed.

In accordance with an embodiment of the present disclosure, the components of the PCIe device 1000 may be implemented with one or more processors and a memory or register.

Figure 21:
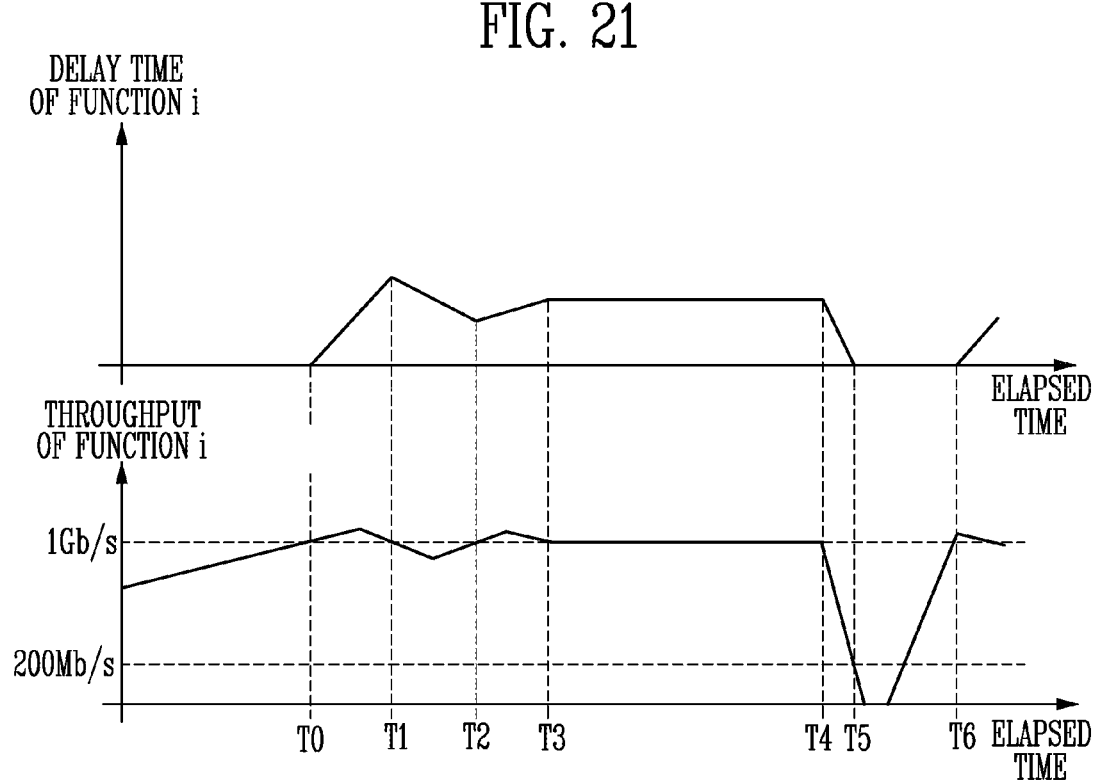
FIG. 21 is a graph for explaining an operation of generating delay time information according to an embodiment of the present disclosure.

FIG. 21 is a graph for explaining an operation of generating delay time information according to an embodiment of the present disclosure.

An upper portion of FIG. 21 may indicate a change in a delay time of a function i depending on an elapsed time. The delay time of the function i may be generated by the delay time information generator 330 of FIG. 20. A lower portion of FIG. 21 may indicate a change in a throughput of the function i depending on the elapsed time. The throughput of the function i may be generated by the throughput calculator 310 of FIG. 20.

The function i described in FIG. 21 may indicate one of the plurality of functions illustrated in FIG. 18. In FIG. 21, it is assumed that a throughput limit of the function i is set to 1 Gb/s and a minimum performance threshold value of the function i is set to 200 Mb/s. It is assumed that an initial value of the delay time of the function i is '0.'

Before time T0, the throughput of the function i is lower than the throughput limit, and thus the delay time of the function i may still be the initial value.

During a period from the time T0 to time T1, the throughput of the function i exceeds the throughput limit, and thus the delay time information generator 330 may calculate a delay time increment value based on an excess ratio of the calculated throughput to the throughput limit of the function i. Accordingly, the delay time of the function i may be increased by the delay time increment value.

During a period from the time T1 to time T2, the throughput of the function i does not exceed the throughput limit, but is higher than the minimum performance threshold value, and thus the delay time information generator 330 may calculate a delay time decrement value based on a residual ratio of the calculated throughput to the throughput limit of the function i. Accordingly, the delay time of the function i may be decreased by the delay time decrement value.

During a period from the time T2 to time T3, the throughput of the function i exceeds the throughput limit, and thus the delay time information generator 330 may calculate a delay time increment value based on the excess ratio of the calculated throughput to the throughput limit of the function i. Accordingly, the delay time of function i may be increased again by the delay time increment value.

During a period from the time T3 to time T4, it is assumed that an increase and a decrease in the delay time of the function i are repeated, and thus the delay time of the function i is maintained at a constant value. In this way, in accordance with an embodiment of the present disclosure, a command fetch operation may be controlled based on delay times of respective functions, and thus limitation in performance for each function may be promptly and accurately performed.

During a period from the time T4 to time T5, the throughput of the function i does not exceed the throughput limit and is higher than the minimum performance threshold value, and thus the delay time information generator 330 may calculate a delay time decrement value based on the residual ratio of the calculated throughput to the throughput limit of the function i. Accordingly, the delay time of the function i may be decreased again by the delay time decrement value.

At the time T5, the throughput of the function i is lower than the minimum performance threshold value, and thus the delay time information generator 330 may set the delay time of the function i to the initial value. Accordingly, the delay time of the function i may be '0.'

During a period from the time T5 to time T6, when the throughput of the function i is lower than the throughput limit and thus the delay time of the function i has the initial value, the delay time of the function i may be maintained at the initial value. That is, when the delay time is the initial value, the delay time does not increase until the throughput of the function i exceeds the throughput limit.

At the time T6, the throughput of the function i exceeds the throughput limit, and thus the delay time information generator 330 may calculate a delay time increment value based on the excess ratio of the calculated throughput to the throughput limit of the function i. Accordingly, the delay time of the function i may be increased again by the delay time increment value.

Figure 22:
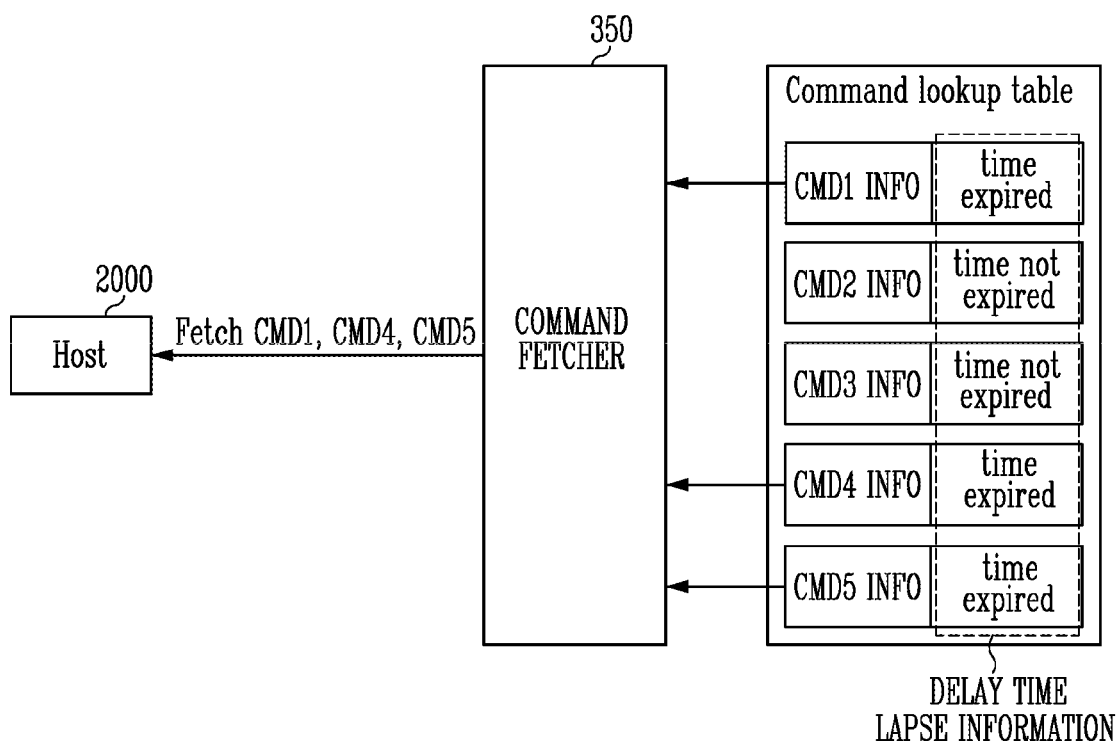
FIG. 22 illustrates a command fetch operation according to an embodiment of the present disclosure.

FIG. 22 illustrates a command fetch operation according to an embodiment of the present disclosure.

Referring to FIG. 22, a command lookup table may store command-related information for a plurality of target commands and delay time lapse information associated with the command-related information. In FIG. 22, it is assumed that command-related information CMD1 INFO to CMD5 INFO respectively for five target commands CMD1 to CMD5 are stored in the command lookup table.

The command fetcher 350 of FIG. 20 may determine, based on the command lookup table, whether a command fetch operation for target commands is to be performed. The command fetcher 350 may check the command-related information and the delay time lapse information, which are stored in the command lookup table, at a time point at which the command fetch operation is performed. Based on the result of checking, the command fetcher 350 may perform the command fetch operation for the target commands when delay times corresponding to the target commands have expired, and may skip the command fetch operation for the target commands when the delay times have not expired.

For example, referring to FIG. 22, the delay time lapse information stored in association with the command-related information CMD1 INFO, CMD4 INFO, and CMD5 INFO may include information indicating that the corresponding delay times have expired. In this case, the command fetcher 350 may send a fetch command to the host 2000 to fetch the first target command CMD1, the fourth target command CMD4, and the fifth target command CMD5 from the host 2000.

Unlike these target commands, the delay time lapse information stored in association with the command-related information CMD2 INFO and CMD3 INFO may include information indicating that the corresponding delay times have not expired. In this case, the command fetcher 350 may skip a command fetch operation for the second target command CMD2 and the third target command CMD3.

Figure 23:
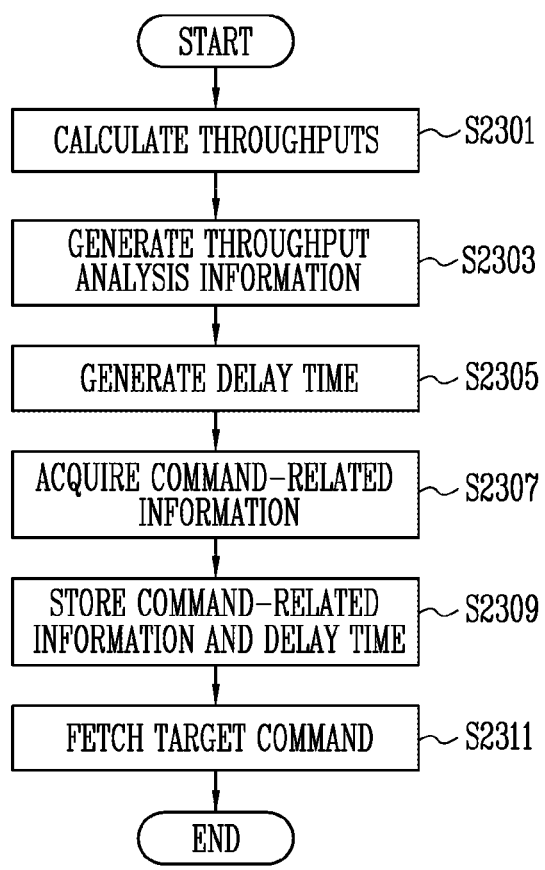
FIG. 23 is a flowchart illustrating a method of operating a PCIe device according to an embodiment of the present disclosure.

FIG. 23 is a flowchart illustrating a method of operating a PCIe device according to an embodiment of the present disclosure.

The method illustrated in FIG. 23 may be performed by, for example, the PCIe device 1000 illustrated in FIG. 20.

Referring to FIG. 23, at S2301, the PCIe device 1000, e.g., the throughput calculator 310, may calculate throughputs of a plurality of functions.

Here, the PCIe device 1000, e.g., the throughput calculator 310, may calculate occupation rates of the plurality of functions for a data path shared between the functions based on the number of transaction layer packets of each function processed through the data path per unit time. The PCIe device 1000, e.g., the throughput calculator 310, may calculate the throughputs based on the occupation rates.

At S2303, the PCIe device 1000, e.g., the throughput analysis information generator 320, may generate throughput analysis information for each of the plurality of functions based on a throughput limit set for each of the functions and a throughput calculated for each of the functions.

At S2305, the PCIe device 1000, e.g., the delay time information generator 330, may generate a delay time of each of the plurality of functions based on the throughput analysis information.

Here, the PCIe device 1000, e.g., the delay time information generator 330, may increase a delay time of a function, for which the calculated throughput exceeds the throughput limit, among the plurality of functions, based on an excess ratio of the calculated throughput to the throughput limit.

Further, the PCIe device 1000, e.g., the delay time information generator 330, may decrease a delay time of a function, for which the calculated throughput does not exceed the throughput limit, among functions having delay times that are higher than an initial value, based on a residual ratio of the calculated throughput to the throughput limit.

Furthermore, the PCIe device 1000, e.g., the delay time information generator 330, may set a delay time of a function, which is in an idle state, and a delay time of a function, for which the calculated throughput is lower than a minimum performance threshold value, among the plurality of functions, to the initial value.

At S2307, the PCIe device 1000, e.g., the command lookup table storage 340, may acquire command-related information including information related to a target command to be fetched from a host.

At S2309, the PCIe device 1000, e.g., the command lookup table storage 340, may store the command-related information and a delay time of a function corresponding to the target command.

At S2311, the PCIe device 1000, e.g., the command fetcher 350, may fetch the target command from the host based on the command-related information and the delay time of the function corresponding to the target command.

Figure 24:
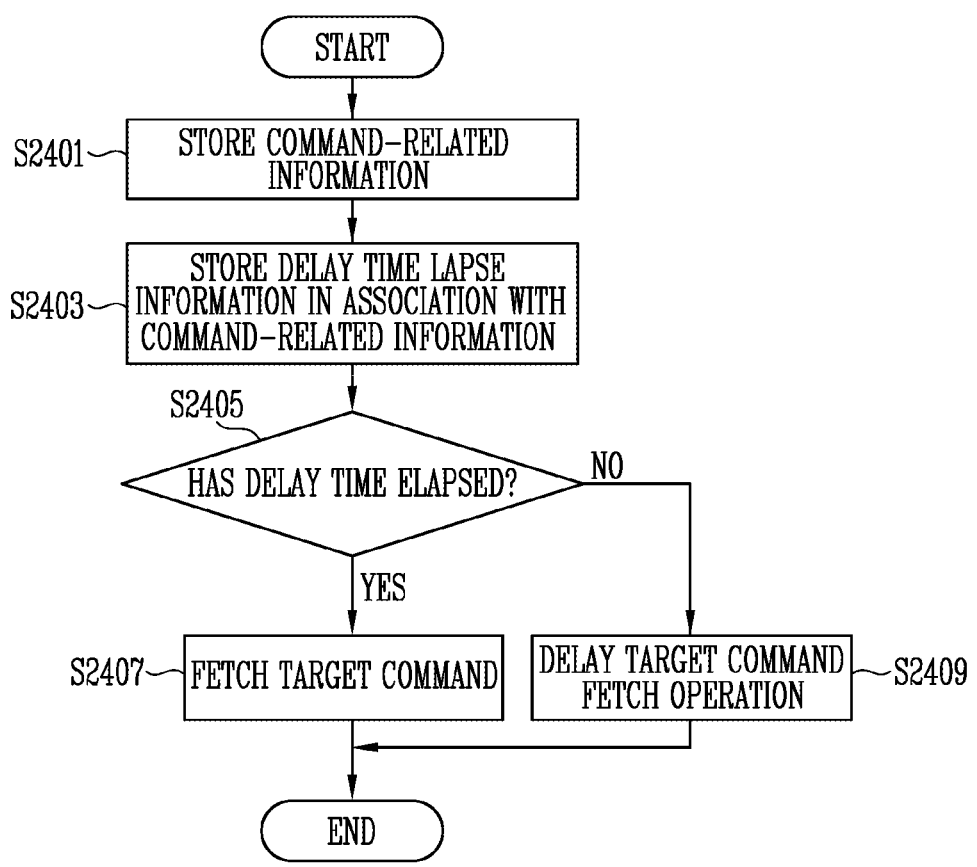
FIG. 24 is a flowchart illustrating a method of fetching a target command according to an embodiment of the present disclosure.

FIG. 24 is a flowchart illustrating a method of fetching a target command according to an embodiment of the present disclosure.

The method illustrated in FIG. 24 may be obtained by realizing S2309 and S2311 illustrated in FIG. 23.

The method illustrated in FIG. 24 may be performed by, for example, the PCIe device 1000 illustrated in FIG. 20.

Referring to FIG. 24, at S2401, the PCIe device 1000, e.g., the command lookup table storage 340, may store command-related information.

At S2403, the PCIe device 1000, e.g., the command lookup table storage 340, may store delay time lapse information in association with the command-related information.

At S2405, the PCIe device 1000, e.g., the command lookup table storage 340, may determine, based on the delay time lapse information, whether the delay time of the function corresponding to the target command has elapsed or expired. When it is determined at S2405 that the delay time has elapsed, the PCIe device 1000, e.g., the command fetcher 350, may perform S2407.

At S2407, the PCIe device 1000, e.g., the command fetcher 350, may fetch the target command from the host.

In contrast, when it is determined at S2405 that the delay time has not elapsed, the PCIe device 1000, e.g., the command fetcher 350, may perform S2409.

At S2409, the PCIe device 1000, e.g., the command fetcher 350, may delay a command fetch operation for the target command.

In accordance with the present disclosure, there are provided a PCIe device that is capable of limiting performance for each function and a method of operating the PCIe device.

What is claimed is:

1. A Peripheral Component Interconnect Express (PCIe) device, comprising:
    a performance analyzer configured to measure throughputs of a plurality of functions, and generate throughput analysis information indicating a comparison result between the throughputs of the plurality of functions and throughput limits corresponding to the plurality of functions;
    a delay time information generator configured to generate a delay time for delaying a command fetch operation for each of the plurality of functions based on the throughput analysis information; and
    a command fetcher configured to fetch a target command from a host based on a delay time of a function corresponding to the target command.

2. The PCIe device according to claim 1, the performance analyzer comprises:
    a throughput calculator calculates a throughput of each of the plurality of functions based on occupation rates of the plurality of functions for a data path shared between the plurality of functions; and
    a throughput analysis information generator configured to generate the throughput analysis information for each of the plurality of functions.

3. The PCIe device according to claim 2, wherein the throughput calculator calculates the occupation rates of the plurality of functions based on a number of transaction layer packets of each function processed through the data path per unit time.

4. The PCIe device according to claim 1, wherein the PCIe device further comprises a command lookup table storage configured to store command-related information on the target command to be fetched from the host and the delay time of the function corresponding to the target command.

5. The PCIe device according to claim 4, wherein the command fetcher delays the command fetch operation for the target command when the delay time of the function has not elapsed from a time point at which the command-related information is stored.

6. The PCIe device according to claim 1, wherein, for each of the plurality of functions, the throughput analysis information includes at least one of information indicating whether a throughput exceeds a throughput limit, an excess ratio of the throughput to the throughput limit, a residual ratio of the throughput to the throughput limit, information about whether each of the plurality of functions is in an idle state, and information about whether the throughput is lower than a minimum performance threshold value set for each of the plurality of functions.

7. The PCIe device according to claim 6, wherein the delay time information generator is configured to increase the delay time of the function based on the excess ratio when the throughput exceeds the throughput limit.

8. The PCIe device according to claim 6, wherein the delay time information generator is configured to decrease the delay time of the function based on the residual ratio when the throughput is within the throughput limit, and
    wherein the function has delay times higher than an initial value, among the plurality of functions.

9. The PCIe device according to claim 6, wherein the delay time information generator sets a delay time of a function that is in an idle state and a delay time of a function, for which the throughput is lower than the minimum performance threshold value, among the plurality of functions, to an initial value.

10. The PCIe device according to claim 1, wherein the throughput includes a read throughput corresponding to a read operation and a write throughput corresponding to a write operation of each of the plurality of functions,
    wherein the throughput analysis information includes read throughput analysis information corresponding to the read operation and write throughput analysis information corresponding to the write operation, and
    wherein the delay time includes a read delay time corresponding to the read operation and a write delay time corresponding to the write operation.

11. The PCIe device according to claim 1, the PCIe device further comprises a traffic class controller configured to allocate traffic class values to transaction layer packets received from the plurality of functions based on the throughputs of the plurality of functions.

12. The PCIe device according to claim 11, wherein the traffic class controller is configured to, whenever a ranking of the throughputs of the plurality of functions varies, reallocate the traffic class values of the transaction layer packets based on the varied ranking.

13. The PCIe device according to claim 11, wherein the traffic class controller is configured to allocate a default value as initial values for traffic classes of the transaction layer packets received from the plurality of functions.

14. The PCIe device according to claim 11, wherein the traffic class controller is configured to allocate a default value as a traffic class value of a transaction layer packet received from a function for which a throughput is greater than a threshold value, among the plurality of functions.

15. The PCIe device according to claim 11, wherein the traffic class controller is configured to allocate a default value as a traffic class value of a transaction layer packet received from an interrupted function, among the plurality of functions.

* * * * *